(12) United States Patent
Keshmiri et al.

(10) Patent No.: US 12,631,454 B2
(45) Date of Patent: May 19, 2026

(54) SYSTEMS AND METHODS FOR AIRCRAFT GUIDANCE

(71) Applicant: University of Kansas, Lawrence, KS (US)

(72) Inventors: Shawn Keshmiri, Lawrence, KS (US); Jeffrey Xu, Lawrence, KS (US); Aaron Mckinnis, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 249 days.

(21) Appl. No.: 18/487,901

(22) Filed: Oct. 16, 2023

(65) Prior Publication Data

US 2024/0142236 A1 May 2, 2024

Related U.S. Application Data

(60) Provisional application No. 63/416,232, filed on Oct. 14, 2022.

(51) Int. Cl.
*G01C 21/16* (2006.01)
*G08G 5/80* (2025.01)

(52) U.S. Cl.
CPC .............. *G01C 21/16* (2013.01); *G08G 5/80* (2025.01)

(58) Field of Classification Search
CPC .................................. G01C 21/16; G08G 5/80
See application file for complete search history.

(56) References Cited

U.S. PATENT DOCUMENTS

| | | | | |
|---|---|---|---|---|
| 11,187,793 B1 * | 11/2021 | Liu | ...................... | G05D 1/0214 |
| 2021/0179100 A1 * | 6/2021 | Fritz | ..................... | B60W 30/10 |

FOREIGN PATENT DOCUMENTS

| | | | | |
|---|---|---|---|---|
| DE | 102019211087 A1 * | 1/2020 | ........... | B60W 40/09 |
| EP | 1913569 B1 * | 10/2008 | ............... | G08G 5/55 |
| EP | 3839920 A1 * | 6/2021 | ............... | G09B 9/05 |
| JP | 2014002113 A * | 1/2014 | | |

OTHER PUBLICATIONS

Brandt, J.B., et al., "Propeller Performance Data at Low Reynolds Numbers," 49th AIAA Aerospace Sciences Meeting, American Institute of Aeronautics and Astronautics, Jan. 4-7, 2011, Orlando, FL (18 pages).
Chowdhury, M., et al., "Design and flight test validation of a UAS lateral-directional model predictive controller," 2021 International Conference on Unmanned Aircraft Systems (ICUAS), pp. 639-646 (2021), https://doi.org/10.110-9/ICUAS51884.2021.9476811.

(Continued)

*Primary Examiner* — Mary Cheung
(74) *Attorney, Agent, or Firm* — Ray Quinney & Nebeker P.C.; Paul N. Taylor

(57) ABSTRACT

A method for guiding an aerial system is described. The method includes an act of determining a plurality of reference points at a single time. The method includes one or more of an act of determining a longitudinal acceleration based on one or more of the plurality of reference points or an act of determining a lateral acceleration based on one or more of the plurality of reference points.

20 Claims, 21 Drawing Sheets

(56) References Cited

OTHER PUBLICATIONS

Jardin, M. R., et al., "Optimized Measurements of Unmanned-Air-Vehicle Mass Moment of Inertia with a Bifilar Pendulum," Journal of Aircraft, vol. 46, No. 3, May-Jun. 2009, https://doi.org/10.2514/1.34015.

Kim, A. R., et al., "Dynamic Modeling and Simulation of a Quadcopter with Motor Dynamics," School of Engineering, The University of Kansas, Lawrence, KS, 66045, USA, Jan. 5, 2017, https://doi.org/10.2514/6.2017-1560 (16 pages).

Roskam, J.: Airplane flight dynamics and automatic flight controls. DARcorporation (2001).

Shukla, D., et al., "Flight Test Validation of a Safety-Critical Neural Network Based Longitudinal Controller for a Fixed-Wing UAS," Jun. 8, 2020, AIAA 2020-3093.

Shukla, D., et al., "Imitation Learning for Neural Network Autopilot in Fixed-Wing Unmanned Aerial Systems," 2020 International Conference on Unmanned Aircraft Systems (ICUAS), Athens, Greece, 2020, pp. 1508-1517, doi: 10.1109/ICUAS48674.2020.9213850.

Xu, J. et al., "Flight Test of the Novel Fixed-Wing Multireference Multiscale LN Guidance Logic for Complex Path Following," Department of Aerospace Engineering, University of Kansas, Lawrence, Kansas, USA, 25 pages.

* cited by examiner

100

102

104

200

202

204

2700

SYSTEMS AND METHODS FOR AIRCRAFT GUIDANCE

CROSS-REFERENCE TO RELATED APPLICATIONS

This application claims priority to and the benefit of U.S. Provisional Patent Application No. 63/416,232, filed on Oct. 14, 2022, which is hereby incorporated by reference in its entirety.

GOVERNMENTAL RIGHTS

This invention was made with government support under 80NSSC20M0109, NNX15AJ97H, and 80NSSC19C0102 awarded by the National Aeronautics and Space Administration. The government has certain rights in the invention.

BACKGROUND

Unmanned aerial systems (UAS) have evolved beyond their initial military and defense applications and are now being integrated into various civilian sectors, including urban air taxis, air merchandise delivery, unmanned traffic management, infrastructure analysis, and precision agricultural maintenance. As the global population and urbanization continue to grow at an accelerated pace, the demand for transportation is expected to triple by 2050, posing significant challenges to our current transportation network. Traditional ground-based transportation methods are struggling to meet these growing demands.

BRIEF SUMMARY

In some aspects, the techniques described herein relate to a method for guiding an aerial system, including: determining a plurality of reference points at a single time; and determining a longitudinal acceleration based on the plurality of reference points.

In some aspects, the techniques described herein relate to a method for guiding an aerial system, including: determining a plurality of reference points at a single time; and determining a lateral acceleration based on the plurality of reference points.

In some aspects, the techniques described herein relate to a method for guiding an aerial system, including: determining a plurality of reference points at a single time; determining a lateral acceleration based on one or more of the plurality of reference points; and determining a longitudinal acceleration based on one or more of the plurality of reference points.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
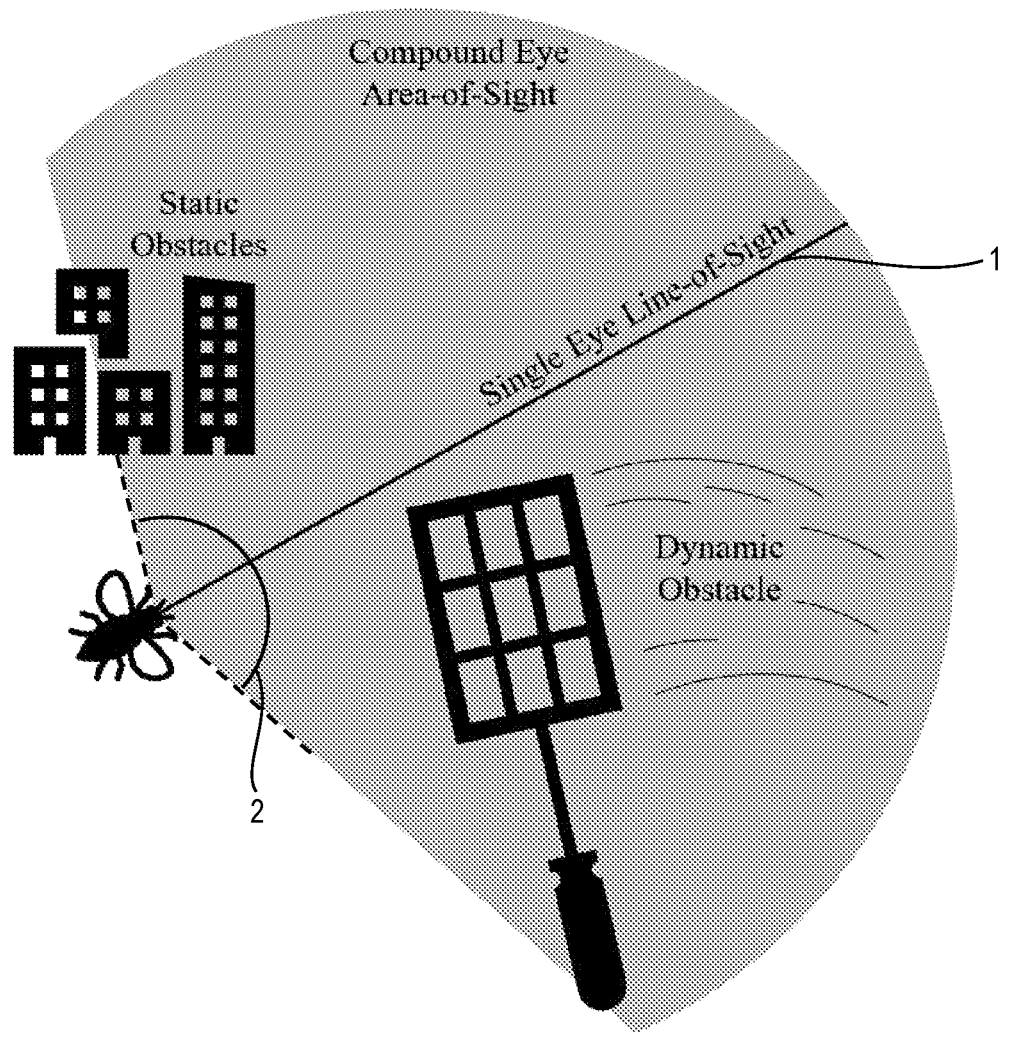
FIG. 1 is a conceptual drawing illustrating an example of the spatial awareness of insects.

This disclosure generally relates to systems and methods for aerial guidance. More specifically, one or more embodiments described herein provide aerial guidance using a plurality of reference points to determine an acceleration based on two or more of the reference points.

The deployment of urban air mobility (UAM) is imminent as major cities worldwide are on the brink of realizing its potential. Extensive research has been conducted on the use of UAS delivery systems for commercial, medical, and emergency missions. However, most of these investigations focus on rotorcraft with stop-think-go capabilities. While these capabilities are advantageous, rotorcraft generally have significantly reduced range, endurance, speed, and payload compared to fixed-wing aircraft. This poses a challenge when navigating within the spatial constraints of a tight urban environment.

Urban airspaces present a particularly challenging environment for fixed-wing UAS due to their dynamics. Fixed-wing UAS have a minimum forward velocity due to the risk of stall and have extremely high moments of inertia compared to rotorcraft. Unlike rotorcraft that can quickly change trajectory when an unexpected object is encountered, fixed-wing aircraft cannot overcome their inertia. Any miscalculated guidance or control values can result in dangerous overshoot and oscillatory behaviors. Despite these challenges, the superior economics of fixed-wing forward flight has led many organizations to explore vertical takeoff and landing (VTOL) aircraft with promising results.

For fixed-wing UAM to mature, a highly accurate and robust guidance, navigation, and control (GNC) scheme is required. This scheme should allow the aircraft to follow its desired paths safely and efficiently without overshoot, oscillations, or steady-state errors.

The most popular method of aircraft guidance is the line-of-sight $(L_1)$ guidance logic, which tracks a single reference point on a desired path set at a certain distance away. However, this method frequently struggles with tracking angular and/or complex paths. Subsequent aircraft guidance methods expanded upon line-of-sight guidance but still focused on following a single reference point on a continuous differentiable path, which is unlikely in constrained urban environments.

A method for following complex non-continuous segmented paths $(L_{2+}$ guidance) was developed, which involves following and switching between individual segments of the entire path. However, this method may be insufficient in terms of scalability as it generally requires specific switch time tuning for each use-case. Focusing on a single reference point across the entire path artificially limits the path-following ability of any guidance logic.

Thus, the inventors have identified a need to overcome one or more of the limitations of a single reference point method. At least one embodiment that utilizes a plurality of reference points provides improved guidance over conventional aerial guidance systems. For example, the dynamics produced by at least one embodiment of the methods described herein are Lipschitz continuous and/or well behaved between $$-\frac{\pi}{2} < \eta_N, \beta_N < \frac{\pi}{2}$$

as will be described below. In another example, the dynamics produced by at least one embodiment of the methods described herein are Lyapunov stable over one or more of 50%, 60%, 75%, 90%, 95%, 99%, and a full range of aircraft velocities. At least one embodiment of a method described herein tracks angular and/or complex paths without the shortcomings of prior art guidance methods. At least one embodiment of an aerial guidance method described herein can be applied to a fixed-wing aerial system and provide a highly accurate and robust guidance, navigation, and control (GNC) scheme sufficient for use as a UAM in a large city (e.g., having a population density of greater than 3,000 people per square mile). At least one embodiment of an aerial guidance method described herein can be applied to a fixed-wing aerial system and allow the aerial system to follow its desired paths safely and efficiently without overshoot, oscillations, or steady-state errors sufficient for use as a UAM in a large city (e.g., having floor area ratio (FAR) of greater than 0.2).

Although fixed wing aircraft are provided as an example of a UAS, this disclosure is not so limited. Other UAS types may incorporate one or more features described herein. Additionally, although the disclosure discusses the use of unmanned aerial systems, the disclosure is not so limited. The methods described herein may be applied to manned aerial systems. For example, one or more embodiments of a method described herein may be implemented as an autopilot method and/or an aerial assistance system.

Referring now to FIG. 1, insects, through millions of years of evolution, have developed a unique method of spatial awareness and threat detection. This has been achieved by evolving from simple single aperture eyes, which have a single eye line of sight 1 to multi-lensed compound eyes. These compound eyes provide insects with a much wider viewing angle 2 and dynamic detection of their environment, as illustrated in FIG. 1. In comparison, a simple single line-of-sight 1 is unable to detect the full scale of its environment. For example, an insect that only has a single line of sight 1 may not incorporate static and/or dynamic obstacles into its flight path to its detriment.

Figure 2:
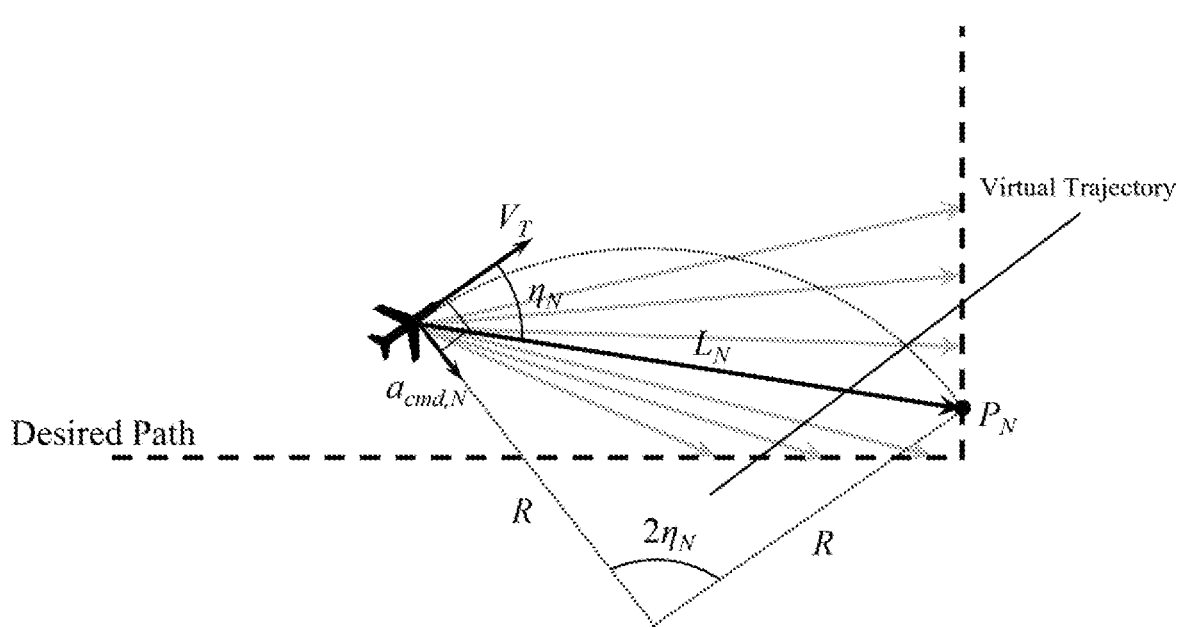
FIG. 2 is a schematic drawing of flight geometry for lateral directional multi-reference point guidance, according to an embodiment of the present disclosure.

Drawing inspiration from the insect's compound eyes, the simple single reference point used in popular line-of-sight guidances may be expanded into a plurality of points $P_N$ (seven points are shown in FIG. 2). Each point may be used for tracking the desired trajectory at different locations. In at least one embodiment, these points allow the aerial system to maintain a higher level of awareness across the entire path and/or allow the aerial system to easily anticipate any changes made to its path. Examples of the geometry of this $L_N$ guidance is presented in FIGS. 5 and 6.

Figure 4:
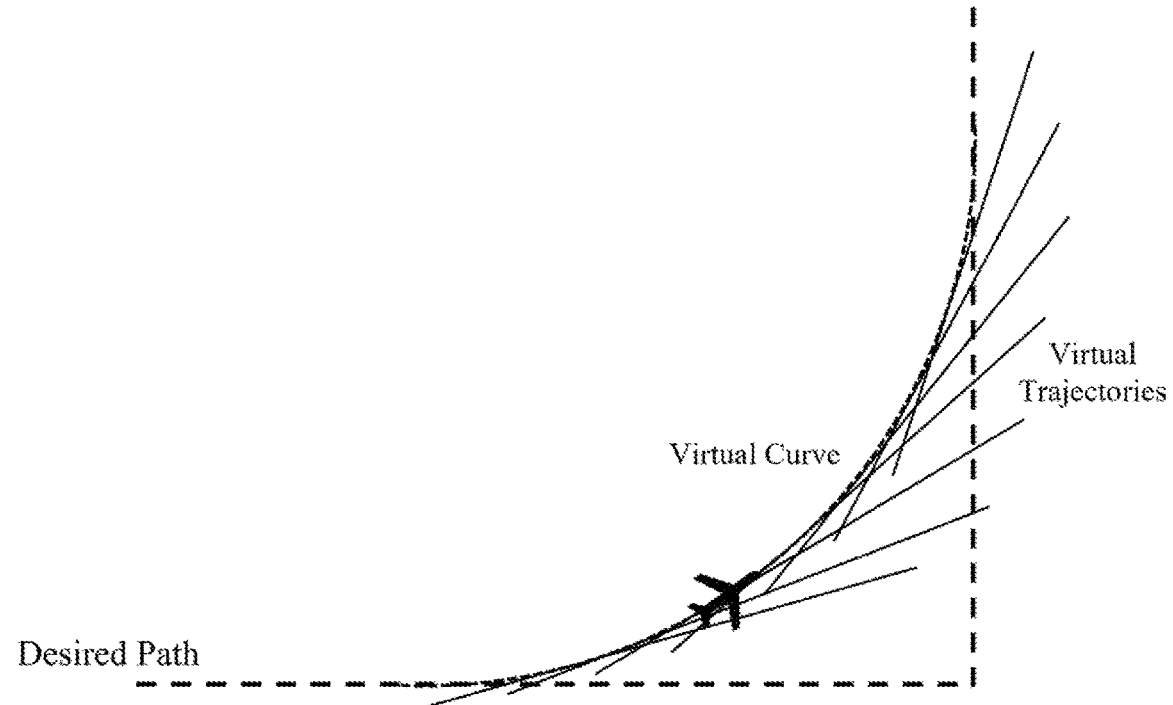
FIG. 4 is a schematic drawing of a virtual continuous path generated using a lateral directional multi-reference point guidance, according to an embodiment of the present disclosure.

By tracking multiple points on the path, at least one embodiment of a method for guiding an aerial system can produce a virtual trajectory that the vehicle follows, rather than one of the two paths at a segmented corner. As the aerial system navigates the corner, multiple virtual paths may be generated. In at least one embodiment, these paths collectively may form a virtual continuous path (e.g., the Virtual Curve shown in FIG. 4) that facilitates smooth transitions between complex path segments by utilizing line-of-sight guidance's innate ability with continuous path tracking. Smooth transitions include, for example, to a first-order response as it converges onto the next part of the desired path. In another example, smoothness represents the ability of guidance logic to converge to the desired path without oscillations and/or overshoot in the most optimal time. Conversely, a converging guidance with no oscillation but delays the convergence, in some embodiments, may not be desirable.

Figure 5:
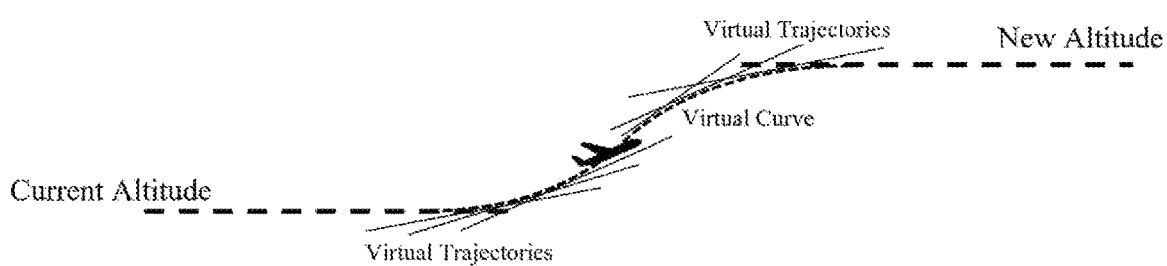
FIG. 5 is a schematic drawing of a virtual continuous path generated using a longitudinal multi-reference point guidance, according to an embodiment of the present disclosure.

In at least one embodiment, logic can be applied to longitudinal guidance (as shown in FIG. 5), allowing for smooth altitude changes without prior knowledge of the desired changes. For example, smooth altitude changes may include a first-order response. Additionally, smooth guidance may avoid rapid changes in the aircraft's acceleration. Rapid changes (e.g., overshoot) can result in a stall condition or structural damage.

3D guidance logic typically follows a single reference point, which couples together the dynamics of longitudinal and lateral-directional guidance. However, due to the significant differences in dynamics between longitudinal and lateral-directional motion, a uniform look-ahead distance may result in inferior tracking for either the lateral-directional or longitudinal aspects. By separating the guidance parameters (e.g., longitudinal and lateral guidance), at least one embodiment of an aerial guidance method described herein can enhance at least one aspect of flight performance (e.g., by providing a more direct path, more stable flight (for example, Lipschitz continuous and/or well behaved flight between $$-\frac{\pi}{2} < \eta_N, \beta_N < \frac{\pi}{2})$$

(in another example, Lyapunov stable flight over one or more of 50%, 60%, 75%, 90%, 95%, 99%, and a full range of aircraft velocities) without compromising either aspect.

In an embodiment of a method for aerial guidance, a plurality of reference points may be used to determine a lateral acceleration of an aerial system. A set of N number of reference points, $P_N$, each at their own respective $L_N$ distance away from the aircraft, may be selected to create an $L_N$ set where $\{L_1 > L_2 > \ldots > L_N\}$. For every $P_N$, a lateral acceleration command, $a_{cmd,N}$, normal to an instantaneous virtual curve, and subsequently the aircraft velocity vector, $V_T$, can be found geometrically as follows:

$$a_{cmd,N} = \frac{\|V_T\|^2}{R} = 2\frac{\|V_T\|^2}{L_N}\sin\eta_N \tag{1}$$

where, $$\sin\eta_N = \frac{V_T \times L_N}{\|V_T\|\|L_N\|} \tag{2}$$

To improve tracking performance on complex paths, the set $a_{cmd,N}$ can be weighted forwards with the weighting set, $\omega = \{\omega_1, \omega_2, \ldots, \omega_N\}$, where $\{\omega_1 > \omega_2 > \ldots > \omega_N > 0\}$, allowing the guidance to focus on further points and adapt to changes in the trajectory; a single weighted $a_{cmd}$ value can then be found by taking the average of the weighted $a_{cmd}$ set.

$$a_{cmd} = \sum_{n=1}^{N} \omega_n a_{cmd,N} \tag{3}$$

Figure 6:
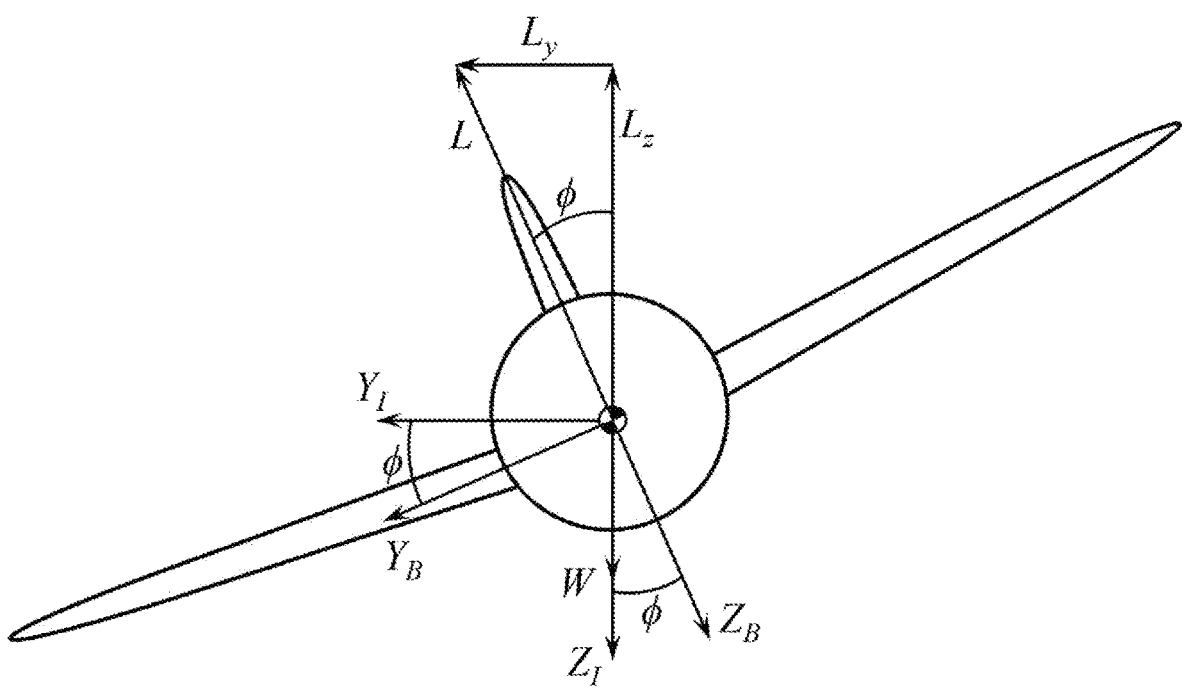
FIG. 6 is a schematic drawing of flight dynamics illustrating aircraft roll, according to an embodiment of the present disclosure.

A roll command, $\phi_{cmd}$, can calculated via the dynamics shown in FIG. 6.

$$\sin\phi_{cmd} = \frac{L_y}{L} = \frac{L_y}{W} = \frac{ma_{cmd}}{mg} = \frac{a_{cmd}}{g} \tag{4}$$

Figure 3:
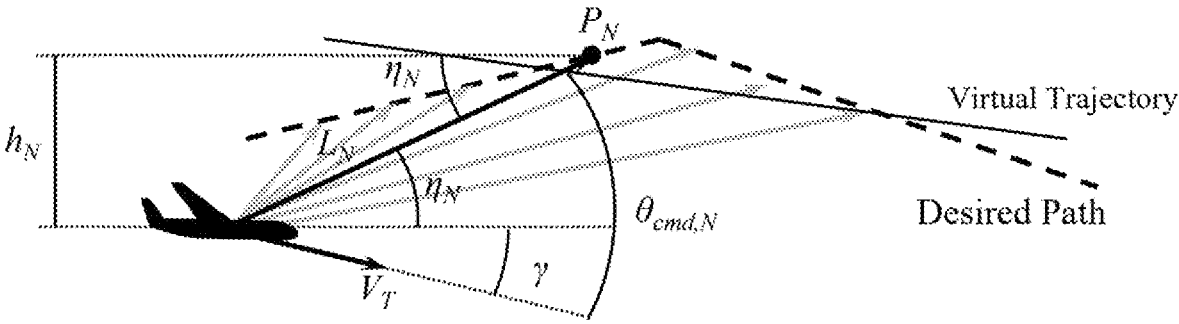
FIG. 3 is a schematic drawing of flight geometry for longitudinal multi-reference point guidance, according to an embodiment of the present disclosure.

In an embodiment of a method for aerial guidance, a plurality of reference points may be used to determine a longitudinal acceleration of an aerial system. A set of N commanded values $\theta_{cmd,N}$ for longitudinal pitch, for each reference point in the set $P_N$. Following the geometry provided in FIG. 3, $\theta_{cmd,N}$ may be calculated as follows:

$$\theta_{cmd,N} = \eta_N - \gamma = \sin^{-1}\left(\frac{h_N}{L_N + h_N}\right) - \sin^{-1}\left(\frac{V_z}{\|V_{x,y}\|}\right) \tag{5}$$

In some embodiments, the angle $\eta_N$ is found through the relationship $$\frac{h_N}{L_N + h_N}$$

rather than pure trigonometry in order to remain within the domain of arc sin. In at least one embodiment, this provides the benefit of giving a greater command when the error is large (e.g., greater than or equal to the longest $L_N$ line) between the UAS and desired altitude.

Since a different $L_N$ set is used in longitudinal guidance, a different weighted set, $\omega$, may also be used. Altitude changes are very costly due to the aircraft second-order phugoid mode. Therefore, in one or more embodiments where it is desirable to reduce and/or minimize altitude changes, the longitudinal $\omega$ can be back weighted, where $0 < \omega_1 < \omega_2 < \ldots < \omega_N$. In at least one embodiment, this produces a more regulatory guidance behavior by focusing on closing the errors between the aircraft and desired altitude. In one or more embodiments where the UAS is expected to have large and numerous altitude changes, a front weighted $\omega$ set, similar to the lateral-directional embodiments described above, can be used. $\theta_{cmd}$ may be calculated in the same fashion as $\varphi_{cmd}$, where an integral term for $\eta_N$ with a small gain, $K_1$, is used to fixed steady state error, and, in some embodiments, includes an anti-windup component.

$$\theta_{cmd} = \frac{\sum_{n=1}^{N} w_n \theta_{cmd,n}}{N} + K_1 \int \eta_n \qquad (6)$$

Figure 7:
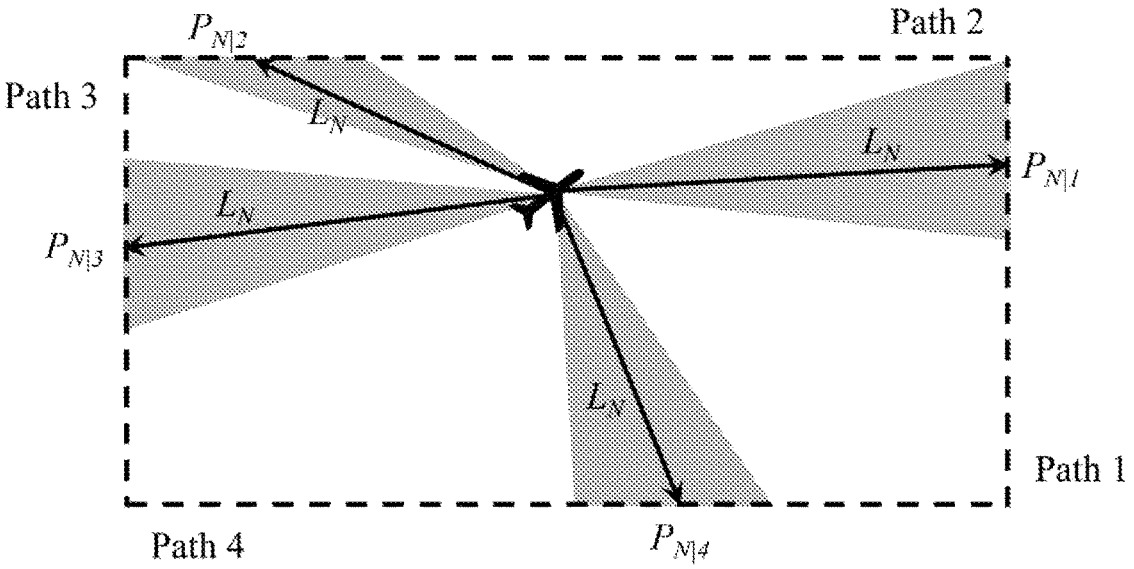
FIG. 7 is a schematic drawing of flight geometry in a full path tracking example, according to an embodiment of the present disclosure.

In at least one embodiment, expanding the field of 'vision' from a localized section to the one or more of a majority, a vast majority, almost all of, or an entirety of the path creates robustness for the type of path and/or adaptability to changes to the path during flight. In at least one embodiment, for a path made up of M segments generated from two waypoints each, two or more segments will have N number of reference points for tracking. For example, the number of reference points may include the set $P_{N|M}$ which relates to the $N^{th}$ point given the $M^{th}$ line. In some embodiments, one or more or all sets of $P_{N|M}$ are the same $L_N$ distance away from the aerial system as shown in FIG. 7. In some embodiments, the $L_N$ distance may vary, but for ease of understanding the distances may be equal.

Figure 8:
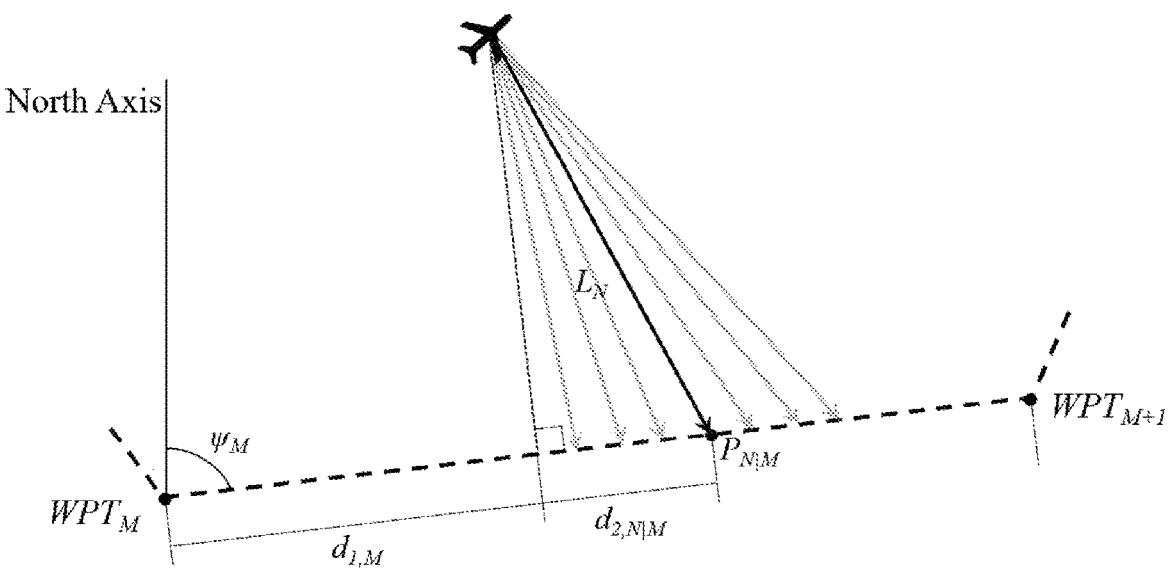
FIG. 8 is a schematic drawing of flight geometry for locating $P_{NIM}$, according to an embodiment of the present disclosure.

The location of all $P_{N|M}$ on every line can be found through the geometry shown in FIG. 8. Although FIG. 8 illustrates four $P_{N|M}$, the disclosure is not so limited. In other embodiments, more or fewer $P_{N|M}$ may be used.

One or more (or all) elements of the set $P_{N|M}$ can be found in $\mathbb{R}^2$ inertial frame coordinates, $\langle N\ E \rangle$, as such:

$$P_{N|M} = WPT_M + (d_{1,M} + d_{2,N|M}) \begin{bmatrix} \cos\ (\psi_M) \\ \sin\ (\psi_M) \end{bmatrix} \qquad (7)$$

In some embodiments, the N points on the path with one or more of the least spatial and the least heading difference may be given priority. In some embodiments, the N points on the path with both the least spatial and the least heading difference may be given priority. In some embodiments, the aerial system may be directed to only follow the $a_{cmd}$ generated from the selected points.

Figure 10:
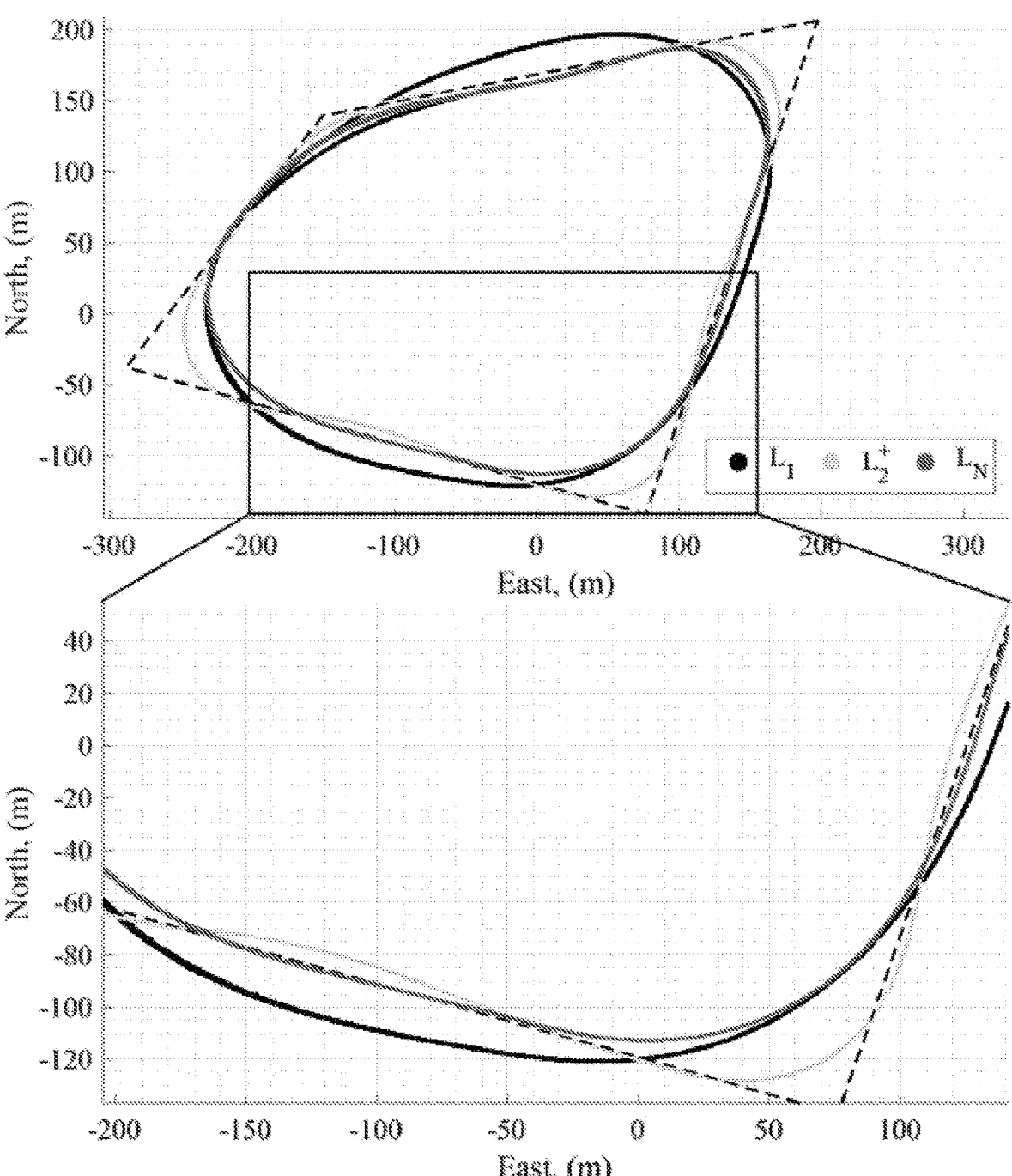
FIG. 10 is experimental results illustrating a HiTL simulation comparison of one or more embodiments of a method for guiding an aerial system as described herein relative to prior art guidance systems, according to an embodiment of the present disclosure.

In at least one embodiment, as the aerial system follows a path generated by one or more methods described herein, new points that fit the least spatial and/or the least heading difference may be prioritized and/or previously used points that fail the least spatial and/or the least heading difference may be deprioritized (e.g., shed) such that only N points may be followed over a period of time. For example, points that fit these criteria may be incorporated into a priority set and points that do not fit these criteria may be ignored. Prioritizing and/or deprioritizing points based on predetermined criteria (e.g., spatial delta threshold, a heading delta threshold, other thresholds) may reduce the amount of processing power required to guide the aerial system. For example, prioritization and/or deprioritization allows the set of $a_{cmd,N}$ to consist of points from more than one segment of the entire path, allowing for smooth transitions between segments and/or awareness over the entire path. Additionally, since a larger portion of the path (e.g., multiple points and/or the entire path in comparison to $L_1$, $L_2$, $L_{2+}$ or other prior art guidance systems) is being seen at all times, any new segments and/or waypoints added during flight may be implemented by one or more of the methods described herein without issue. For example, the primary issue for single point guidance is that it provides a second-order response when transitioning to a different path. FIG. 10 illustrates how two single point guidance logics have oscillations or overshoots, while the $L_N$ guidance does not.

Figure 9:
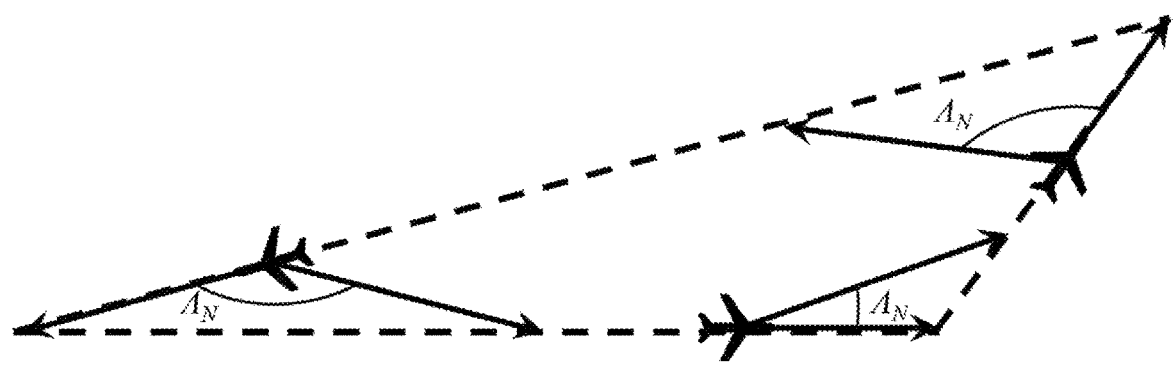
FIG. 9 is a schematic drawing of flight geometry illustrating guidance angle adaption, according to an embodiment of the present disclosure.

For greater robustness and/or improved adaptability when faced with a variety of complex paths, one or more of the weighting sets, (longitudinal and/or lateral) w, can be adjusted dynamically based on the type of available path detected by the guidance logic. Shown in FIG. 9, when a sharper turn is required, the aircraft must have a greater $\varphi_{cmd}$ in order to achieve it. The reverse can be said for a more obtuse angle, in which the aircraft does not need to roll and/or turn as aggressively. Since right-angle turns will be the most common by far in urban areas, each value in the set w can be tuned for right angle performance, while the cornering adaptation set, $\Lambda_N$, can be found as a function of the angle $\Lambda$, made between the $L_N$ lines. Augmenting $\Lambda_N$ into $w_N$ provides an adaptive weighting set that adjusts $w_N$ depending on $\Lambda$.

$$w_N = \frac{w_N}{\cos \Lambda_N} \qquad (8)$$

FIG. 10 provides an example of performance differences achieved on a complex path with varying degrees of turns (e.g., different angles) by an embodiment of a guidance method described herein compared against $L_1$ and $L_{2+}$ guidance. In the comparison shown in FIG. 10, a Python-ROS hardware-in-the-loop (HiTL) environment using the aerial system described below in conjunction with FIG. 14.

As expected, all three guidance logics are capable of tracking the larger obtuse angle, however $L_1$ is shown to be incapable of tracking the path otherwise, with large overshoots at the three acute corners. While $L_{2+}$ guidance removes the overshoot seen in $L_1$ guidance, it is only designed for a single type of path with uniform orthogonal turns and suffers when given a non-uniform path its performance, as shown by the oscillations seen on the straight paths. The HiTL simulations show that the use of one or more adaptive weight sets allows multiple reference point-based guidance to successfully (e.g., achieving a desired destination without collision) and/or efficiently (e.g., using less energy than prior art guidance methods) navigate a wide variety of complex paths. Where $L_1$ and $L_{2+}$ have failed to track the corners successfully, at least one embodiment of a method described herein incorporating one or more of (1) utilization of a plurality of reference points at a single time, (2) determining a lateral acceleration based on at least one reference point and determining a longitudinal acceleration based on at least one reference point, (3) reference point selection (e.g., prioritizing and/or deprioritizing points) based on predetermined criteria (e.g., spatial delta threshold, a heading delta threshold, other thresholds), (4) adaptive weighting sets (e.g., tuning weighting sets for a desired angle, such as a right angle) saw the oncoming sharp turns and adjusted accordingly to provide a smooth and efficient transition. More specifically, the results labeled $L_N$ in FIG. 10 were achieved using 1, 2, 3, and 4.

Algorithm stability verification may be performed according to the following example. First, the aircraft velocity, $V_T$, is broken down into two components, the velocity in the direction of the $L_N$ vector, $V_{LN}$, and the orthogonal component, $V_1$:

$$V_{LN} = V_T \cos(\eta_N) \tag{9}$$

$$V_1 = V_T \sin(\eta_N) \tag{10}$$

Next, the tangent velocity of the reference point is related to the $V_{LN}$ term by the following relationship:

$$V_{tan} = \frac{V_{LN}}{\cos(\beta_N)} \tag{11}$$

Substituting Equation 9 into 11 gives:

$$V_{tan} = \frac{V_T \cos(\eta_N)}{\cos(\beta_N)} \tag{12}$$

Additionally, the velocity orthogonal to $V_{tan}$, denoted $V_2$, is found to be:

$$V_2 = V_T \cos(\eta_N)\tan(\beta_N) \tag{13}$$

Figure 11:
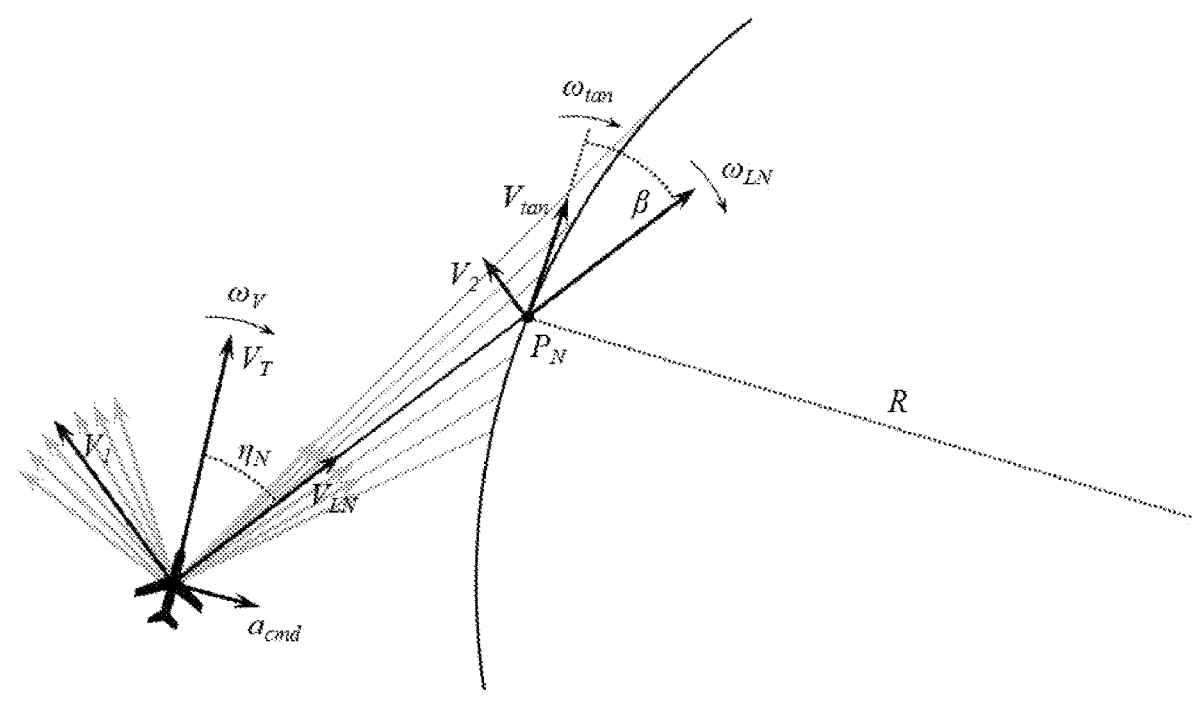
FIG. 11 is a schematic drawing of flight geometry providing an example breakdown of $L_N$ velocities and accelerations, according to an embodiment of the present disclosure.

FIG. 11 illustrates the geometry of the problem. The rate of change of both $\eta_N$ and $\beta_N$ can be constructed by relative relationships one or more inertial angular rates. For example, the rate of change of both $\eta_N$ and $\beta_N$ can be constructed by relative relationships in one or more of the rate of change in $L_N(\omega_{LN})$, rate of change in $V_T(\omega_V)$, or rate of change in $V_{tan}(\omega_{tan})$. These rates may be defined for each $L_N$, vector as:

$$\omega_{LN} = \frac{V_1 - V_2}{L_N} = \frac{V_T}{L_N}[\sin(\eta_N) - \cos(\eta_N)\tan(\beta_N)] \tag{14}$$

$$\omega_V = \frac{a_{cmd}}{L_N} = \frac{2V_T}{L_N}\sin(\eta_N) \tag{15}$$

$$\omega_{tan} = \frac{V_{tan}}{R} = \frac{V_T \cos(\eta_N)}{R \cos(\beta_N)} \tag{16}$$

Where R is equal to the radius of the of the path being followed. In the case of a straight line (e.g., following as presented in this work the R is driven to infinity, forcing $\omega_{tan}$ to zero. The relationships are as follows:

$$\eta \cdot N = \omega_{LN} - \omega_V \tag{17}$$

$$\beta \cdot N = \omega_{LN} - \omega_{tan} \tag{18}$$

Which when substituted in, assuming $R=\infty$ (for a straight line of infinite radius)

$$\eta \cdot N = -\frac{V}{L_n}[\cos(\eta_N)\tan(\beta_N) + \sin(\eta_N)] \tag{19}$$

$$\beta \cdot N = \frac{V}{L_n}[-\cos(\eta_N)\tan(\beta_N) + \sin(\eta_N)] \tag{20}$$

These dynamics are Lipschitz continuous and well behaved between:

$$-\frac{\pi}{2} < \eta_N, \beta_N < \frac{\pi}{2} \tag{21}$$

Looking at Equation 19, it can be seen that $\eta \cdot N = 0$ when $\eta_N = -\beta_N$ and by checking the sign we see:

$$\eta \cdot N > o, \eta_N < -\beta_N$$

$$\eta \cdot N > o, \eta_N > -\beta_N$$

Similarly, due to the $\omega_{tan}$ vanishing during straight line following (e.g., R equal to infinity), Eq. 20 shows that the $\beta \cdot N = 0$ when $\beta N = \eta N$ and:

$$\beta \cdot N > o, \beta_N > \eta_N$$

$$\beta \cdot N > o, \beta_N > \eta_N$$

Figure 12:
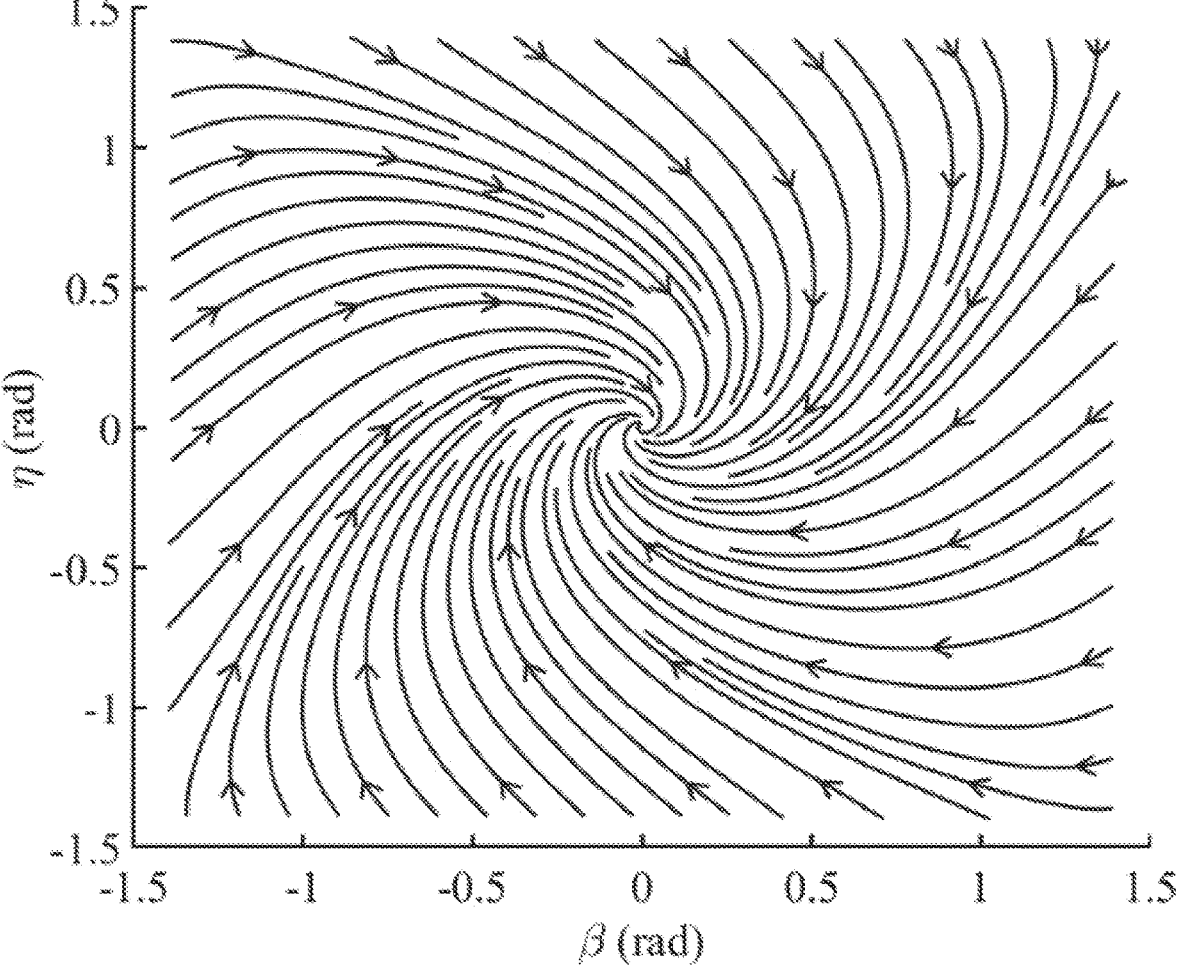
FIG. 12 is a schematic drawing of the trajectories of the guidance dynamics between the bounds $\eta_N \beta_N < \pi/2$ in a phase plot, according to an embodiment of the present disclosure.

The combination of these two conditions leads to a counterclockwise rotation with a stability point $(\eta_{No}, \beta_{No})$ at (0,0). The point (0,0) is of physical significance as it means the aircraft and $L_N$ vector reference point are colinear about the desired waypoint path, implying the guidance has converged. FIG. 12 shows the trajectories of the guidance dynamics between the bounds $\eta_N \beta_N < \pi/2$. Because the velocity of the aircraft must be positive, it is not impacting the sign of the guidance dynamics, rather the ratio of velocity to $L_N$ defines the speed of convergence. Within these bounds the stable point is globally asymptotically stable, and because Lipschitz continuity is ensured it can then be said that at least one embodiment of a method described herein incorporating one or more of (1) utilization of a plurality of reference points at a single time, (2) determining a lateral acceleration based on at least one reference point and determining a longitudinal acceleration based on at least one reference point, (3) reference point selection (e.g., prioritizing and/or deprioritizing points) based on predetermined criteria (e.g., spatial delta threshold, a heading delta threshold, other thresholds), (4) adaptive weighting sets (e.g., tuning weighting sets for a desired angle, such as a right angle) is Lyapunov stable over the full range of aircraft velocities. In some embodiments, only (1) and (2) are needed to achieve Lyapunov stability. In some embodiments, (3) and (4) provide a first order response.

EXPERIMENTAL RESULTS

The following results are based on at least one embodiment of a method described herein incorporating one or more of utilization of a plurality of reference points at a single time and determining a lateral acceleration based on at least one reference point and determining a longitudinal acceleration based on at least one reference point. For ease of discussion, the at least one embodiment of a method will be referred to as $L_N$ guidance. In some embodiments, reference point selection (e.g., prioritizing and/or deprioritizing points) based on predetermined criteria (e.g., spatial delta threshold, a heading delta threshold, other thresholds) and/or adaptive weighting sets (e.g., tuning weighting sets for a desired angle, such as a right angle) may also be used.

Figure 13:
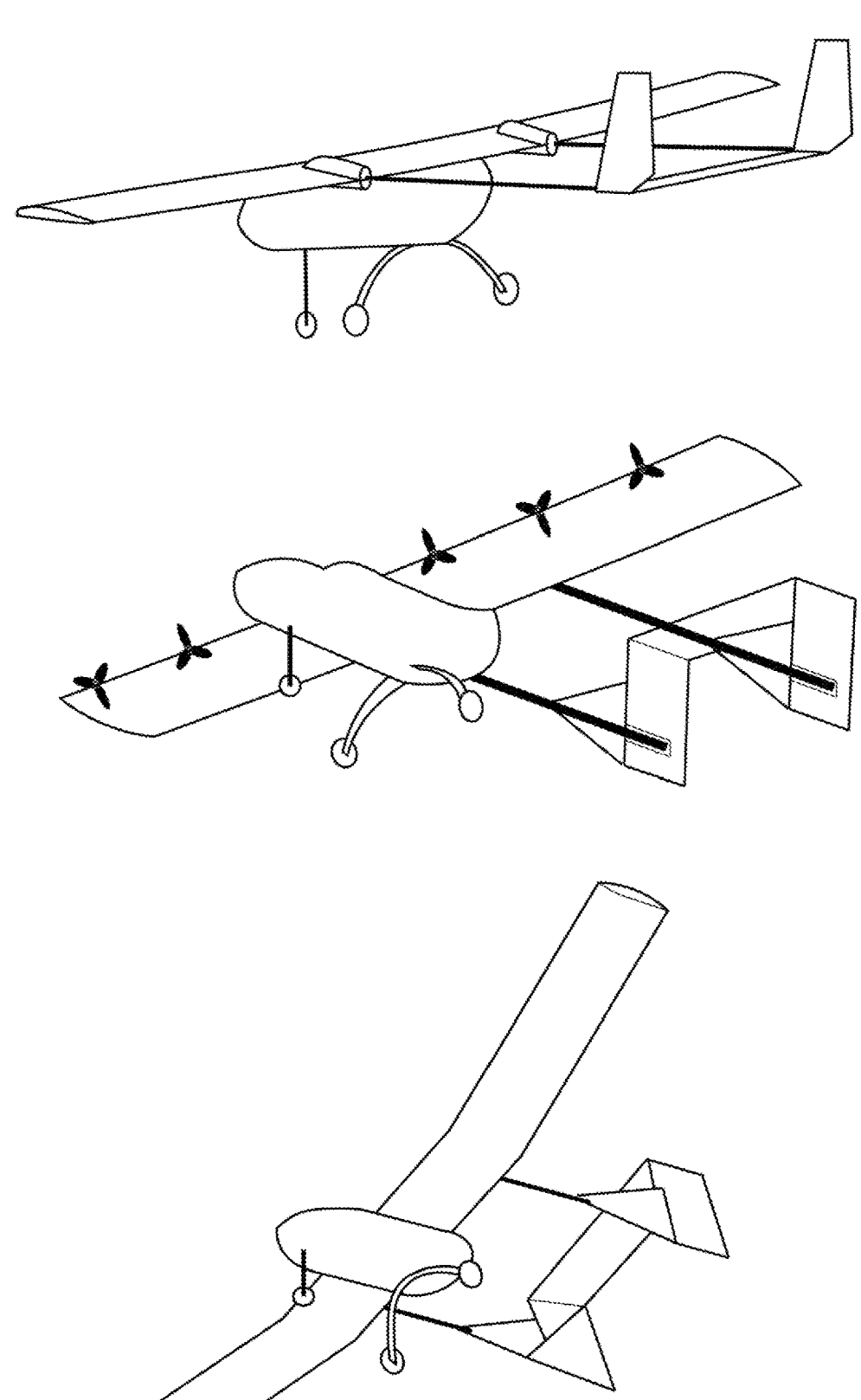
FIG. 13 is a group of photographs of various flight test platforms: SkyHunter UAS (top), @AIR UAS (center), Boreas UAS (bottom), according to an embodiment of the present disclosure.

The $L_N$ guidance was flight tested on three different platforms shown in FIG. 13. The first platform is the SkyHunter UAS, a modified foam, twin boom off-the-shelf system. The SkyHunter has a wingspan of 1.8 m and has a maximum takeoff weight of 4 kg. The second system used for flight testing is the @AIR. It uses the same fuselage as a SkyHunter, but its wing has six forward facing DC motors and a wingspan of 1.98 m. It also has a larger empennage, with taller vertical tails and a top mounted horizontal tail. Due to the motors and associated batteries and structure, the @AIR is also much heavier than a SkyHunter, with a maximum takeoff weight of 5.9 kg. These changes also lead to the @AIR, while wing motors were inoperative, being less maneuverable and having lower performance as compared to a SkyHunter. The third system used for flight testing of the $L_N$ guidance is Boreas, an in-house built twin boom UAS designed for greater endurance than the SkyHunter. Boreas has a wingspan of 2.5 m and weighs 5.7 kg. This large wingspan and comparably low weight result in high mobility compared to SkyHunter and @AIR, and its wing dihedral angle provides a robust response to gusts.

All three aircraft use brushless DC motors for their propulsion. Motor testing is done in the Mal Harned Propulsion Laboratory at the University of Kansas to better model each motor's dynamic response. These static tests, as well as the cruise velocity, are used to estimate the thrust values in flight using methods outlined in Kim, A. R., Vivekanandan, P., McNamee, P., Sheppard, I., Blevins, A., Sizemore, A.: Dynamic modeling and simulation of a quadcopter with motor dynamics. AIAA Modeling and Simulation Technologies Conference (2017). These methods convert the thrust values for one propeller to values for propellers with varying advance ratios as explained in Brandt, J., Selig, M.: Propeller performance data at low Reynolds numbers. 49th AIAA Aerospace Sciences Meeting including the New Horizons Forum and Aerospace Exposition (2011). To find moments of inertia for each UAS, bifilar pendulum tests, as shown in Jardin, M. R., Mueller, E. R.: Optimized measurements of unmanned-air-vehicle mass moment of inertia with a bifilar pendulum in Journal of Aircraft 46 (2009), are performed on the aircraft when fully assembled. Using these values, expected flight conditions for the aircraft, and aircraft geometry, models of each aircraft's flight dynamics can be obtained using Advanced Aircraft Analysis (AAA), an aircraft modelling software produced by DAR corporation. This software outputs aircraft stability and control derivatives based on empirical equations and comparing related geometric characteristics to a large collection of aircraft data. The generated physics-based models are then adjusted via small changes to stability and control derivatives until large portions of flight data provide similar results to simulation using the physics-based model. The stability and control derivatives used for the physics-based model are defined in Roskam, J.: Airplane flight dynamics and automatic flight controls. DARcorporation (2001).

Figure 14:
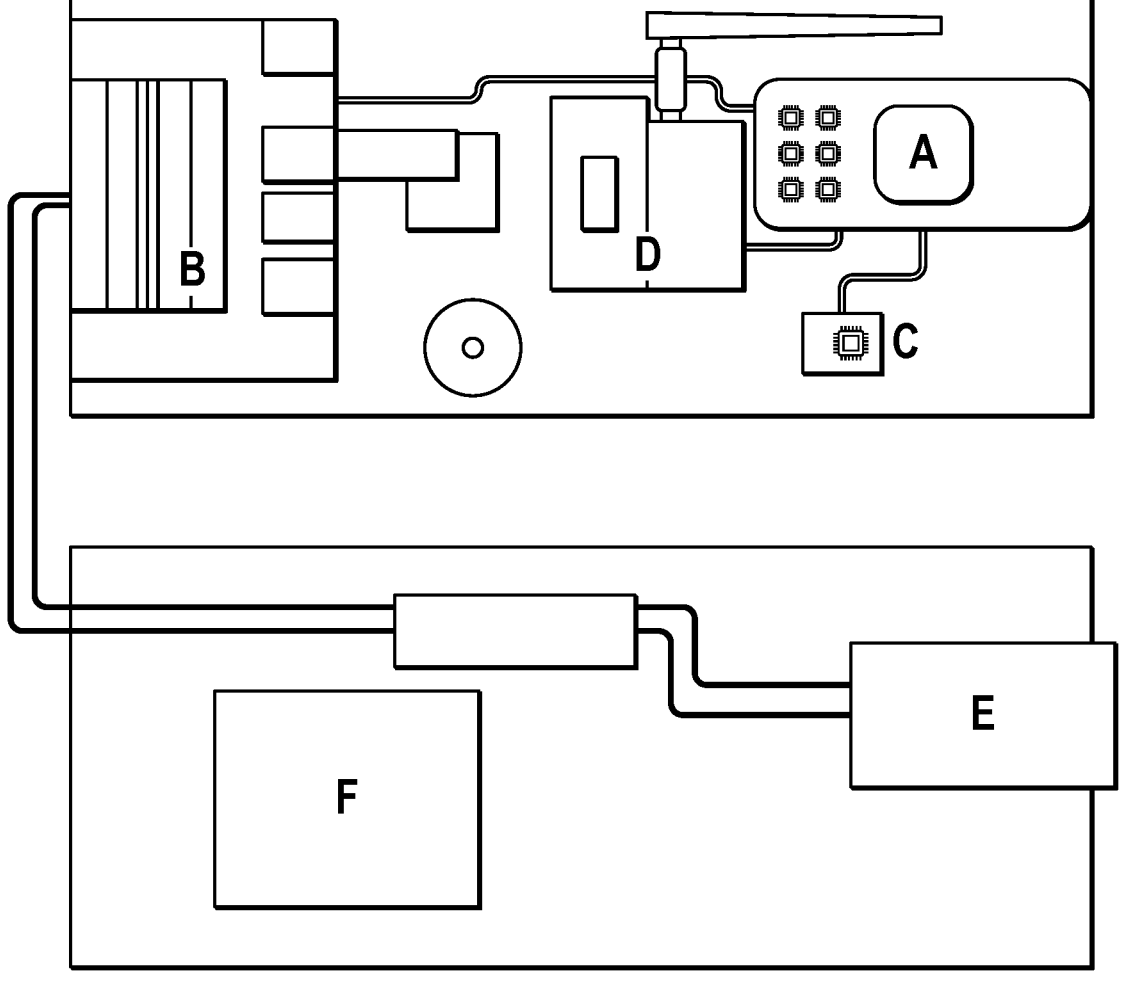
FIG. 14 is a photograph of an example of an onboard avionics board used in testing, according to an embodiment of the present disclosure.

Each aircraft is piloted by an in-house designed avionics unit which is responsible for all flight operations, given in FIG. 14 below. The Pixhawk 2 (A) takes in all sensor information, receives external control inputs via Serial-Mavlink communication from GNC software ran on the onboard flight system, the NVIDIA Jetson Nano (B). Pixhawk also operates as an IMU, a GPS interface, a signal processor for both the I2C signal from the onboard pressure sensor(C) and the PPM signal from the RC (Remote Control) receiver sent via a PPM encoder(D), and a PWM signal generator for both servo deflection commands (Aileron, Elevator, and Rudder) and the Electronic Speed Controller (ESC) (E) for electric motor commands. The Jetson Nano is the main onboard flight computer for the aircraft. It runs Ubuntu, an open-source operating system (OS) on Linux, and Robot Operating System (ROS), a middleware OS. A 900 MHz Microhard telemetry unit (F) allows for real time communication between the UAS and the ground station.

Figure 15:
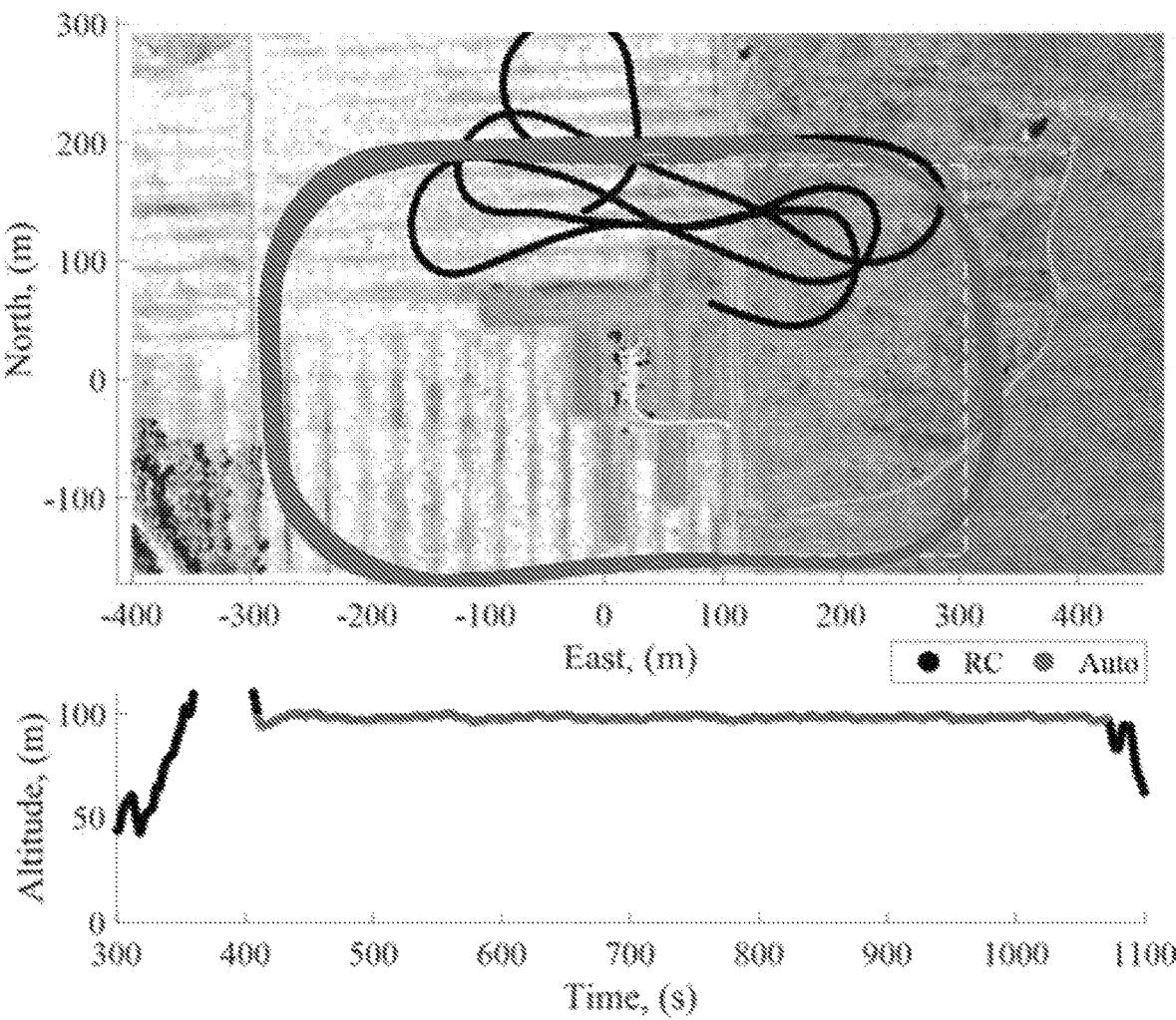
FIGS. 15, 16, and 17 are simulations of trajectories from flight tests of the SkyHunter UAS, Boreas UAS, and @AIR UAS using the same of the one or more methods described herein, according to an embodiment of the present disclosure.
Figure 16:
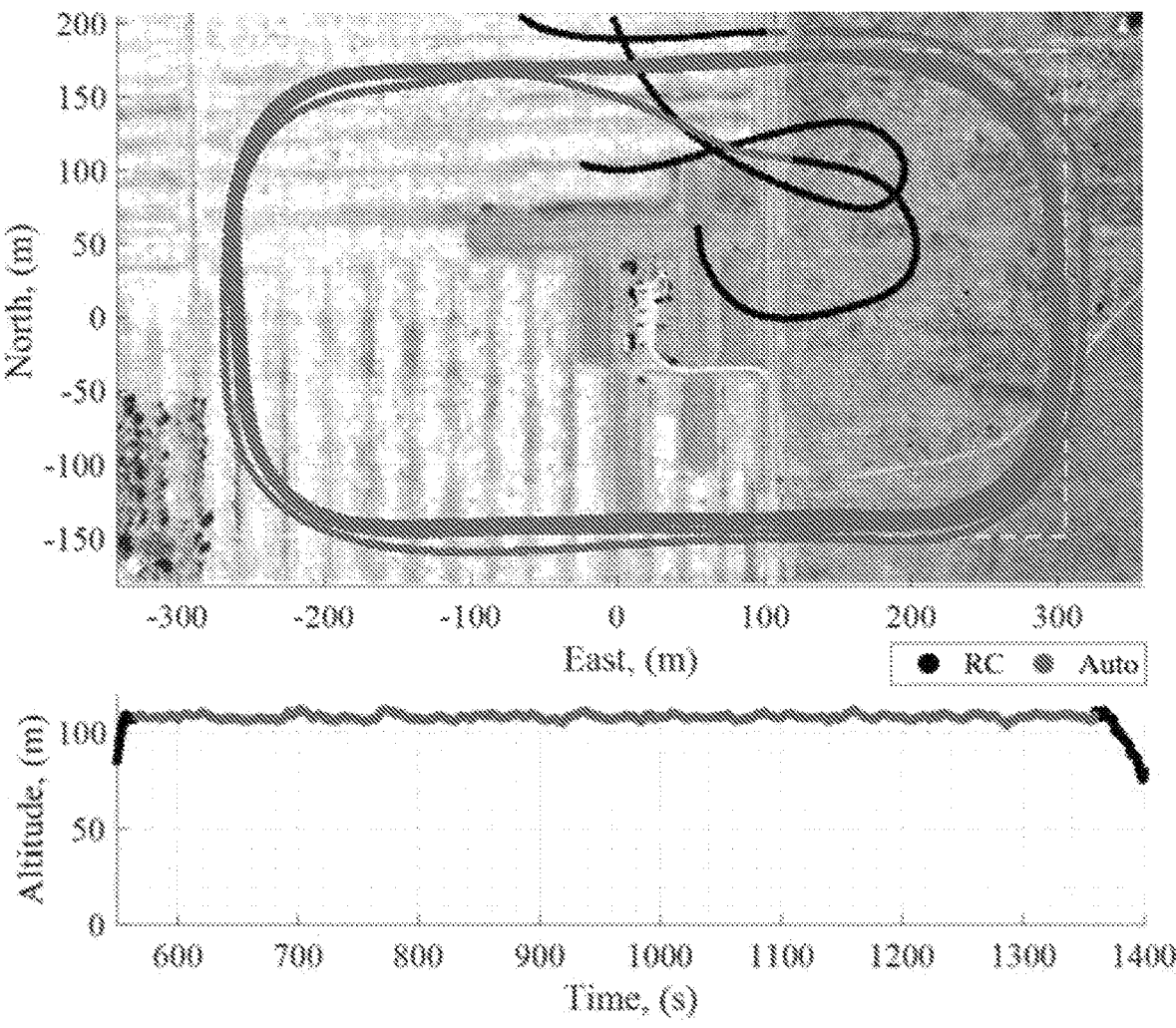
Figure 17:
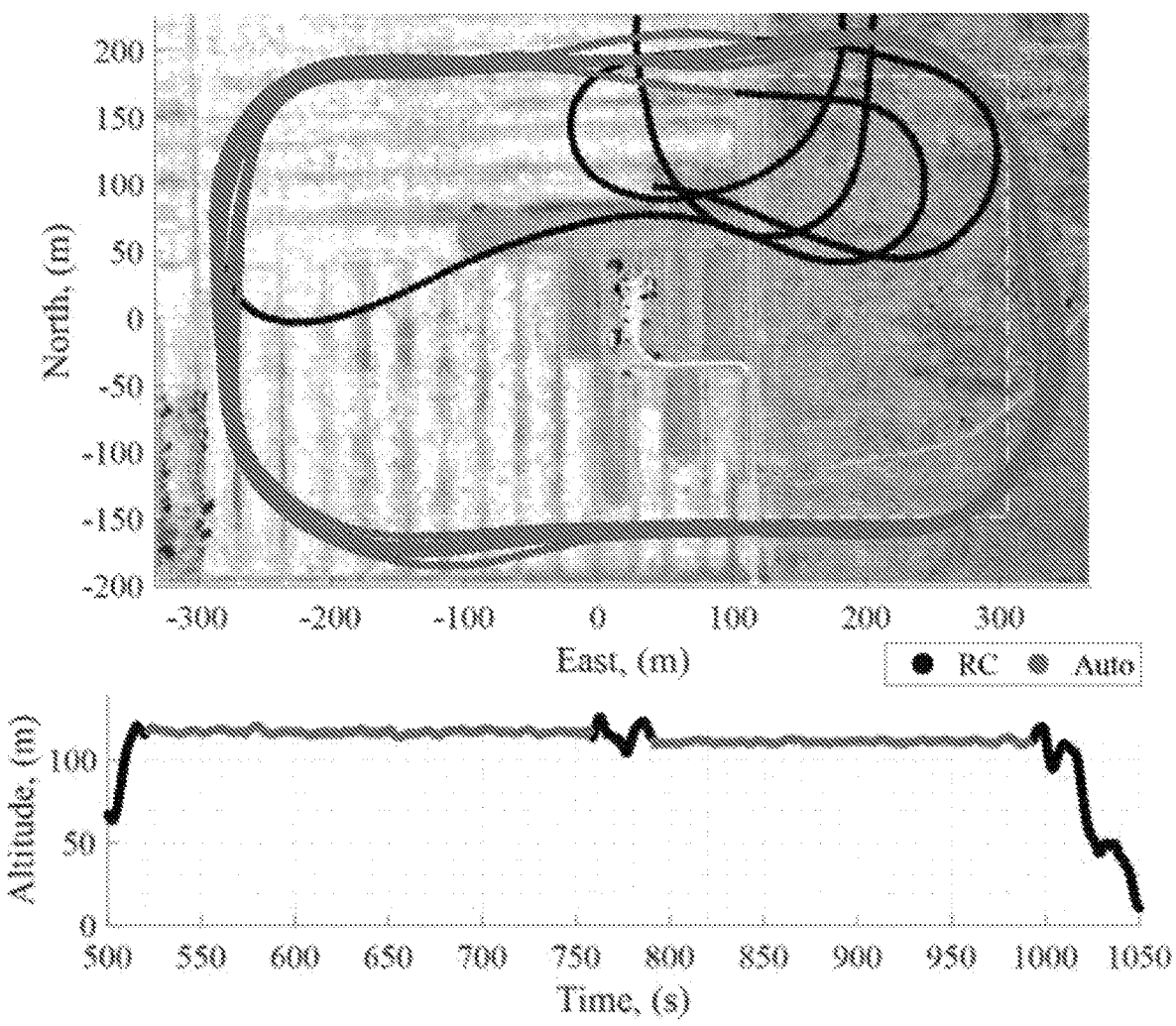

Across the three platforms, $L_N$ guidance logic has flown collectively over 150 times with a variety of controllers. Three trajectories from flight tests are presented below in FIGS. 15, 16, and 17 to provide an example of the tracking performance for $L_N$ guidance. The $L_N$ guidance parameters were originally tuned for a SkyHunter LQR controller, implementation into Boreas involved little tuning, while the @AIR had no tuning and ran the same parameters as the SkyHunter. The tests were conducted with multiple different controller gains and techniques, such as LQR, model predictive, and artificial neural network controllers provided in (1) Chowdhury, M., Keshmiri, S., Xu, J.: Design and flight test validation of a UAS lateral-directional model predictive controller. In: 2021 International Conference on Unmanned Aircraft Systems (ICUAS), pp. 639-646 (2021). https://doi.org/10.1109/ ICUAS51884.2021.9476811, (2) Shukla, D., Lal, R., Hauptman, D., Keshmiri, S. S., Prabhakar, P., Beck-age, N.: Flight Test Validation of a Safety-Critical Neural Network Based Longitudinal Controller for a Fixed-Wing UAS. https://doi.org/10.2514/6.2020-3093, and (3) Shukla, D., Keshmiri, S., Beckage, N.: Imitation learning for neural network autopilot in fixed-wing unmanned aerial systems. In: 2020 International Conference on Unmanned Aircraft Systems (ICUAS), pp. 1508-1517 (2020). https://doi.org/10.01109/ ICUAS48674.2020.9213850.

Figure 18:
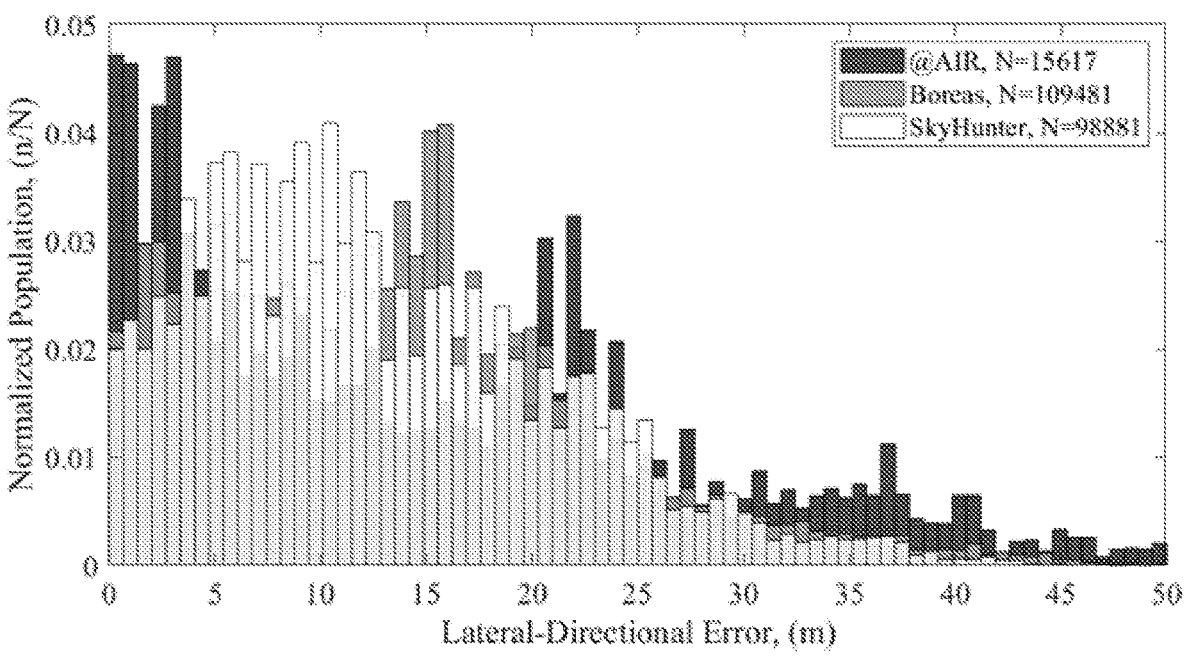
FIG. 18 is a plot of lateral-directional tracking error distribution, according to an embodiment of the present disclosure.
Figure 19:
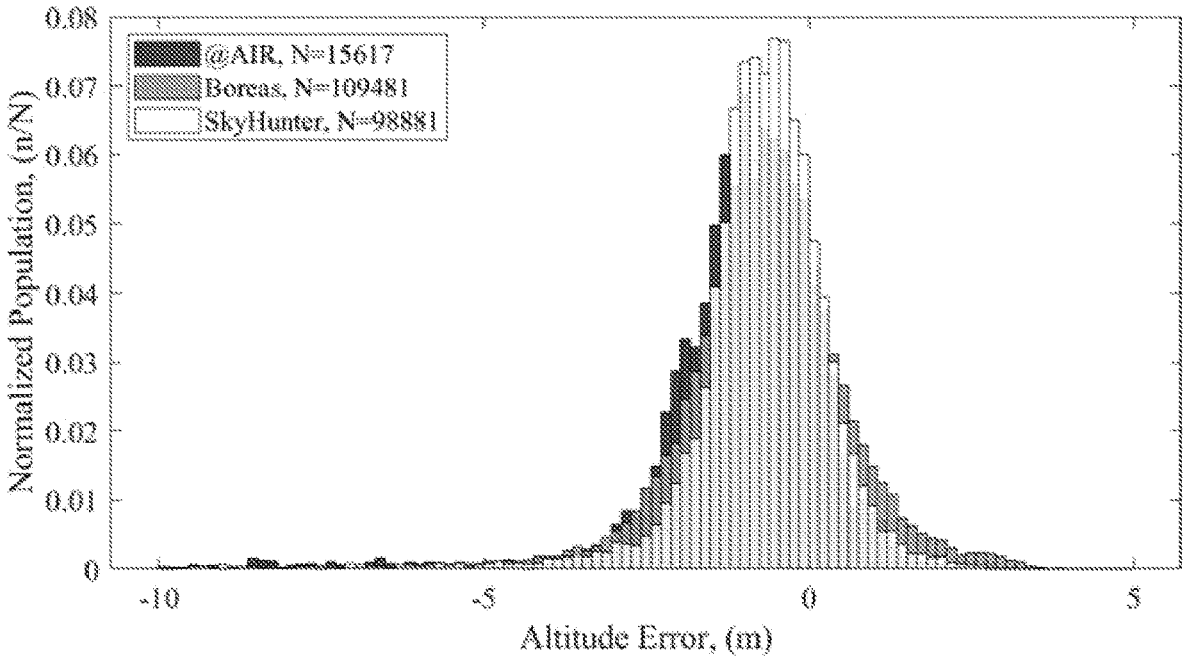
FIG. 19 is a plot of altitude tracking error distribution, according to an embodiment of the present disclosure.
Figure 20:
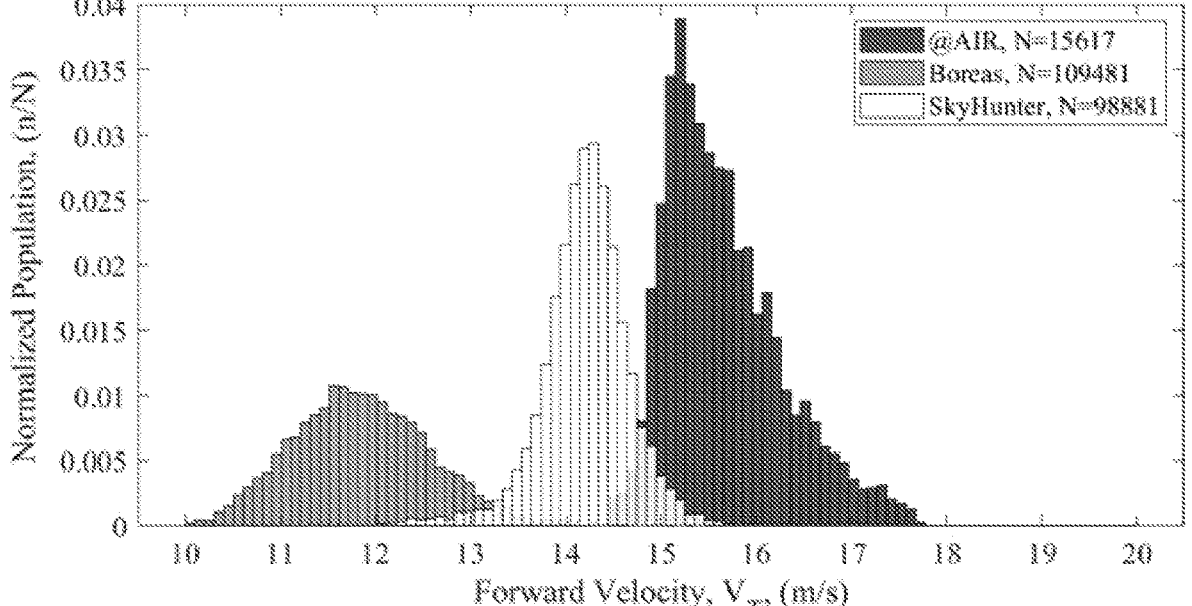
FIG. 20 is a plot of velocity distribution, according to an embodiment of the present disclosure.

The distributions of lateral-directional and altitude error in FIGS. 18 and 19 shown below provide the tracking quality of $L_N$ guidance across the three platforms over 200,000 data points from flight tests. These plots show that despite having immensely different aircraft with significantly dissimilar dynamic models, $L_N$ guidance can be implemented and obtain similar performance with minimal to no tuning.

Figure 21:
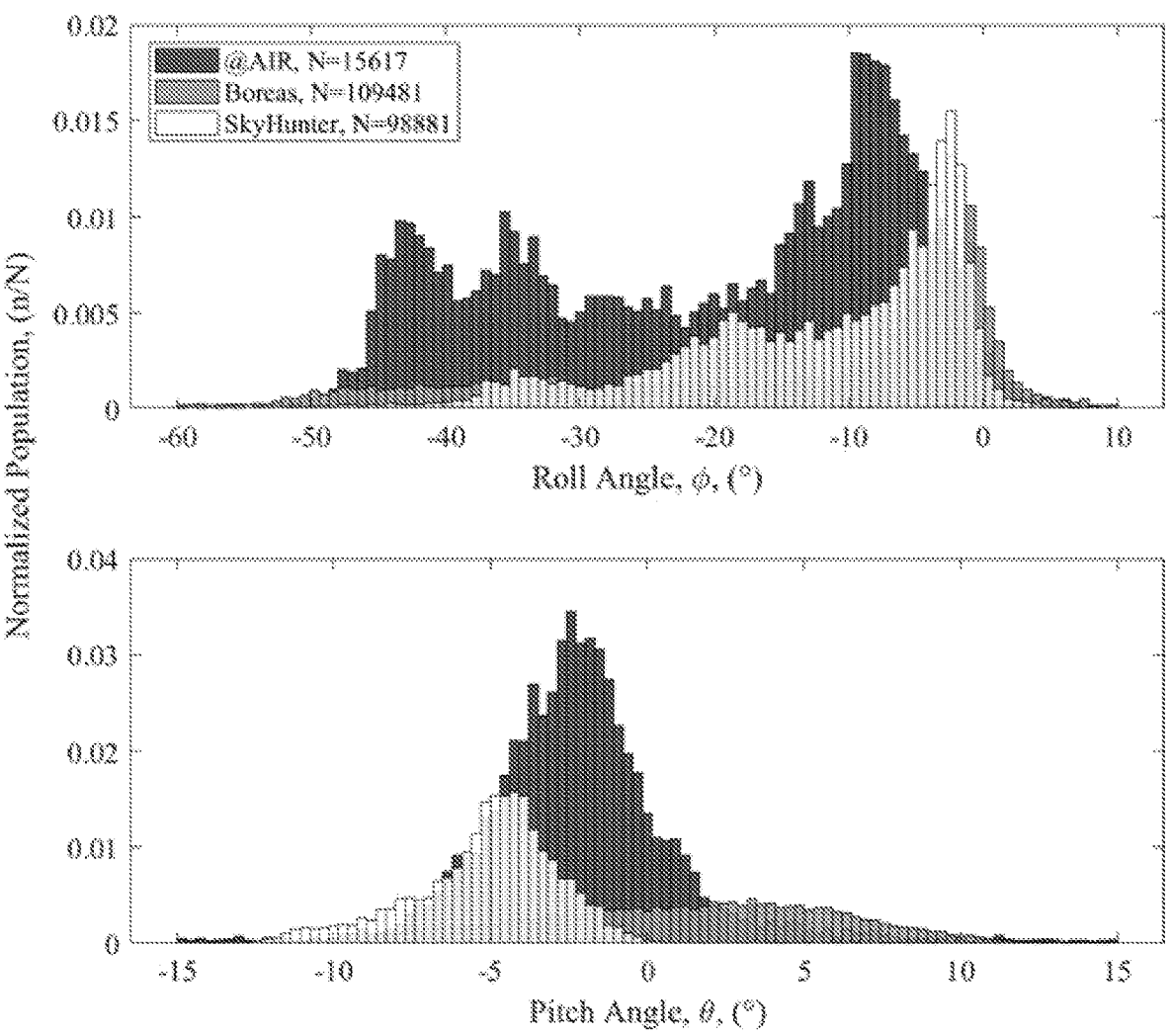
FIG. 21 is a plot of Euler angle distribution, according to an embodiment of the present disclosure.
Figure 22:
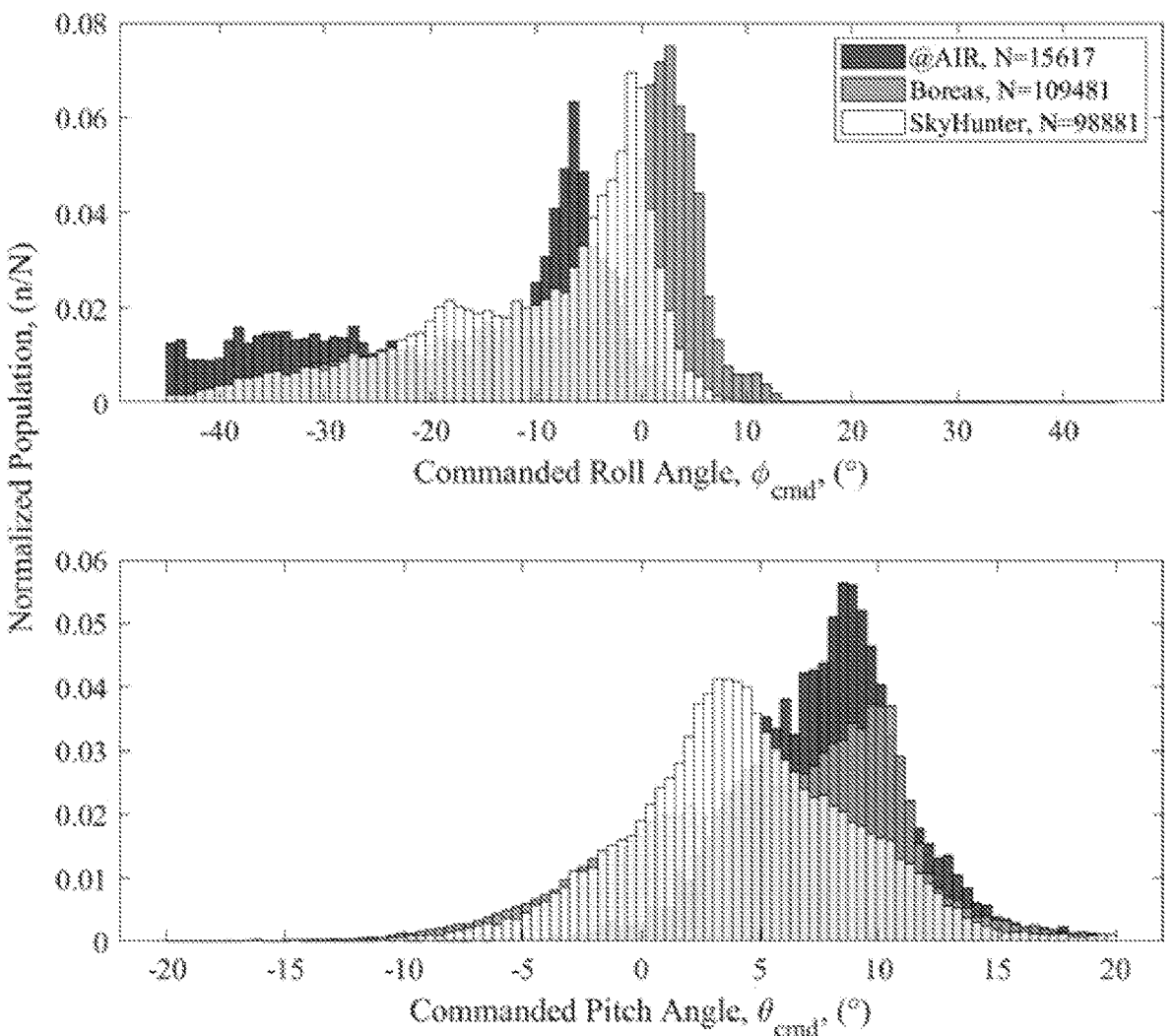
FIG. 22 is a plot of commanded Euler angle distribution, according to an embodiment of the present disclosure.
Figure 23:
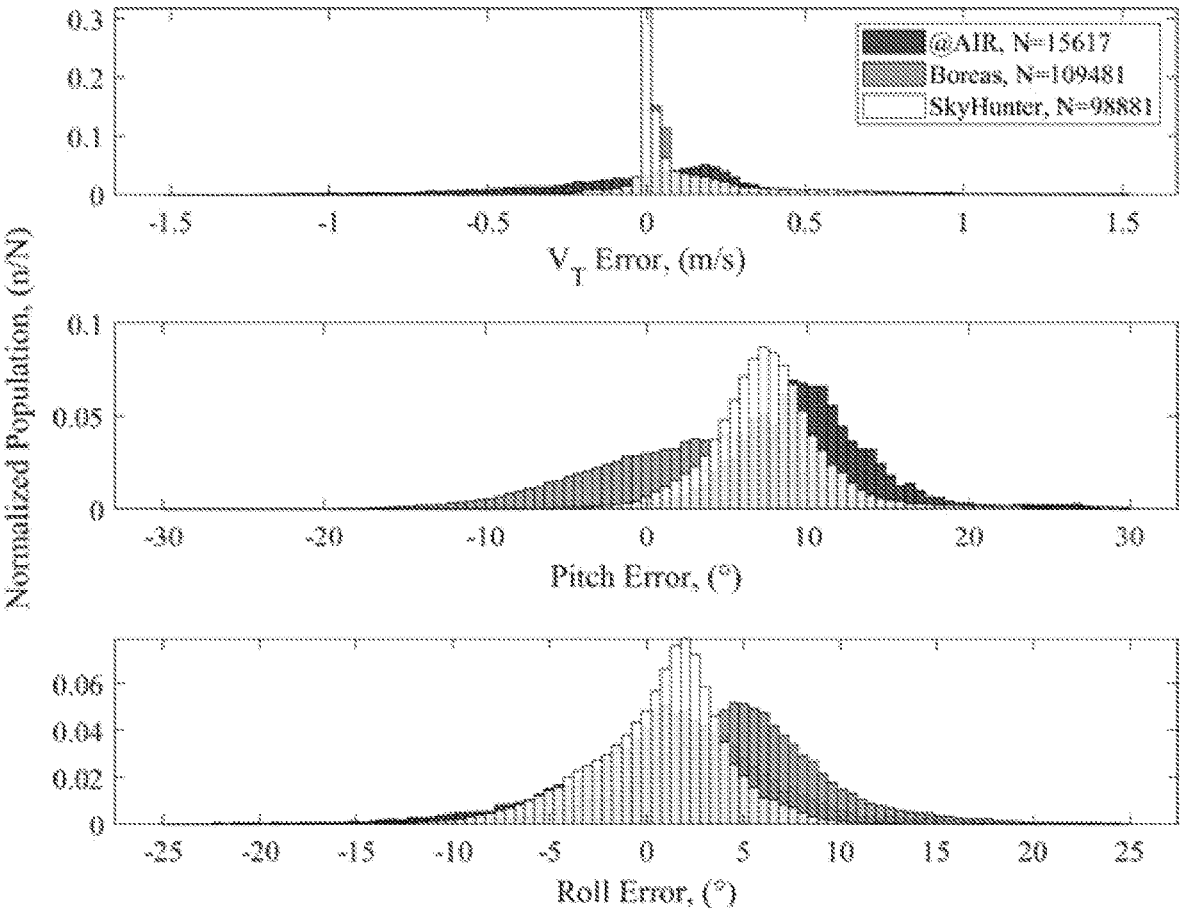
FIG. 23 is a plot of command value tracking error distribution, according to an embodiment of the present disclosure.

FIGS. 21-23 show the distribution of aircraft longitudinal and lateral-directional states directly affected by $L_N$ guidance, guidance commands given, and error between the states and given commands, respectively. $L_N$ guidance is shown to provide very precise tracking performance as $\varphi_{cmd}$ and $\theta_{cmd}$ in FIG. 22 are shown to be tightly concentrated about the aircraft trim points for $\varphi$ and $\theta$. There is a dual distribution seen in $\varphi$ and $\varphi_{cmd}$ that correlates to the roll angle necessary to make the 90° turns. Despite the dual distribution, FIG. 23 shows that $L_N$ guidance provides easy to track for all controllers used with various gains and multiple systems. The aircraft performance distributions shown in FIGS. 18-23 under $L_N$ guidance are summarized in Table 1 below.

TABLE 1

| $L_N$ Performance Across Multiple Flight Tests and Platforms | | | | |
| --- | --- | --- | --- | --- |
| | | SkyHunter | @AIR | Boreas |
| Lat.-Dir. Err. | Mean | 12.9 m | 15.8 m | 13.5 m |
| | Std. Dev. | 8.46 m | 13.2 m | 8.97 m |
| Alt. Err. | Mean | −0.83 m | −1.0 m | −0.77 m |
| | Std. Dev. | 1.65 m | 1.33 m | 1.64 m |
| $V_T$ | Mean | 14.2 m/s | 11.5 m/s | 15.2 m/s |
| | Std. Dev. | 0.507 m/s | 0.898 m/s | 0.878 m/s |
| $\varphi$ | Mean | −7.42 | −8.82 | −4.02 |
| | Std. Dev. | 6.26 | 5.85 | 5.36 |
| $\varphi_{cmd}$ | Mean | −10.5 | −19.6 | −6.05 |
| | Std. Dev. | 12.5 | 11.6 | 15.0 |
| $\theta$ | Mean | −5.09° | −2.07° | 1.10 |
| | Std. Dev. | 2.54 | 4.12 | 5.67 |
| $\theta_{cmd}$ | Mean | 4.46 | 7.94 | 5.34 |
| | Std. Dev. | 3.96 | 5.64 | 5.13 |
| $V_T$ Err. | Mean | 0.125 m/s | 0.0318 m/s | 0.2253 m/s |
| | Std. Dev. | 0.244 m/s | 0.452 | 0.515 m/s |

13

TABLE 1-continued

| $L_N$ Performance Across Multiple Flight Tests and Platforms | | | | |
| --- | --- | --- | --- | --- |
| | | SkyHunter | @AIR | Boreas |
| φ Err. | Mean | 0.652 | 0.955 | 4.45 |
| | Std. Dev. | 3.89 | 5.66 | 5.69 |
| θ Err. | Mean | 7.82 | 9.80 | 2.98 |
| | Std. Dev. | 4.56 | 4.91 | 7.00 |

Despite being employed in three extremely different aircraft platforms with immensely differing dynamics, flight tests results incorporating a large variety of controller techniques across a large variety of environmental influences prove the robustness and scalability of $L_N$ guidance. With little to no tuning, $L_N$ guidance is shown to provide similar tracking potential across the three platforms in FIGS. 15, 16, and 17, while Table 1 shows that the mean and variance of the tracking error for both lateral-direction and altitude remain statistically consistent across all flight-tested cases. Additionally, each aircraft flies at a unique trim point, distinguished by the large differences in mean values for $V_T$, φ and θ; $L_N$ guidance is capable of providing accurate tracking with little difference in variance across the board. Commanded values for both $\varphi_{cmd}$ and $\theta_{cmd}$ are also shown to be statistically consistent with very similar variances. There is very little tracking error for the states φ and T, however, for all three systems θ shows consistently large tracking error, which can be attributed to the behavior of the second-order aircraft longitudinal modes, which are disconnected from longitudinal guidance, unlike the stable first-order aircraft roll mode directly connected to the lateral-directional guidance through aircraft roll dynamics. In spite of the θ error, all three systems maintained consistent altitude tracking performance with extremely small error and variances from the desired altitude.

The above Experimental Results are provided to illustrate advantages that may be achieved by implementing one or more methods described herein. The Experimental Results presented flight test statistical analysis and verification of the bio-inspired $L_N$ guidance logic as a robust 3D guidance method that can be easily implemented into multiple systems. The prior art aircraft line-of-sight guidance has been previously proven to have good tracking capabilities but cannot be used for a noncontinuous complex path generated as a collection of waypoints connected by line segments. Attempts to allow for noncontinuous path tracking results in a non-robust guidance logic that depends on specific tuning parameters, drastically affecting its scalability. Other expansions of line-of-sight guidance require information over the entire path, limiting feasibility of use over a dynamic path with no a priori information. Taking inspiration from compound eyes seen in insects, expanding the unnecessary limit of a virtual continuous path, ideal for line-of-sight algorithms to follow. Robustness is shown to be further increased by letting $L_N$ guidance track every segment of the discretized path with a dynamic weight set, allowing for dynamic changes to the path to occur during flight while maintaining performance. Numerous flight tests were conducted using 3D $L_N$ guidance providing over 200,000 data points. Statistical analysis conducted on the flight test data proves that $L_N$ guidance to be significantly scalable as similar tracking performance was found between three different aircraft with vastly different dynamics. $L_N$ guidance is also proven to be extremely robust as there was little to no tuning done when $L_N$ was implemented into new systems.

14

Figure 24:
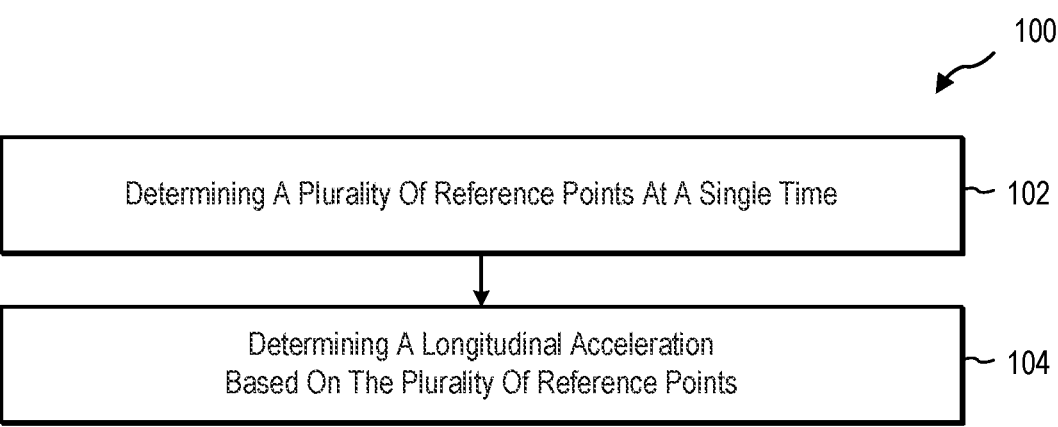
FIG. 24 illustrates a flow diagram for a method or a series of acts for guiding an aerial system as described herein, according to at least one embodiment of the present disclosure.

FIG. 24 illustrates a flow diagram for a method 100 or a series of acts for guiding an aerial system as described herein, according to at least one embodiment of the present disclosure. While FIG. 24 illustrates acts according to one embodiment, alternative embodiments may add to, omit, reorder, or modify any of the acts of FIG. 24.

The method 100 includes an act 102 of determining a plurality of reference points at a single time. The reference points may be determined according to one or more methods described herein. For example, the plurality of reference points may form a set of N number of reference points, $P_N$, each at their own respective $L_N$ distance away from the aircraft, may be selected to create an $L_N$ set where $\{L_1 > L_2 > \ldots > L_N\}$.

The method 100 includes an act 104 of determining a longitudinal acceleration based on the plurality of reference points. For example, a longitudinal acceleration needed to guide an aerial system to a corresponding reference point may be determined.

In some embodiments, a longitudinal acceleration may be selected from the longitudinal accelerations determined for the plurality of reference points. The selected longitudinal acceleration may be used to guide the aerial system.

In some embodiments, determining the longitudinal acceleration includes determining a set of reference points. The set of reference points, in some embodiments, are a distance away from the aerial system. For example, the set of reference points may be a distance $L_N$ from the aerial system. In some embodiments, the set of reference points are equidistant from the aerial system.

In some embodiments, determining the longitudinal acceleration includes weighting a longitudinal acceleration command as described herein. For example, weighting the longitudinal acceleration command may include a back weighting. Weighting the longitudinal acceleration command, in some embodiments, uses the formula:

$$\theta_{cmd} = \frac{\sum_{n=1}^{N} w_n \theta_{cmd,n}}{N} + K_1 \int \eta_n. \qquad (6)$$

In some embodiments, weighting the longitudinal acceleration command includes using an adaptive weighting set based on a predetermined angle. For example, the adaptive weighting set may use:

$$w_N = \frac{w_N}{\cos \Lambda_N} \qquad (8)$$

The predetermined angle, in some embodiments, is a ninety-degree angle. For example, in a UAM environment most turns will be ninety degree turns such that weighting for a ninety-degree turn may provide additional performance in the UAM environment.

In some embodiments, the method 100 may include determining a second plurality of reference points at a single time and determining a second longitudinal acceleration based on the plurality of reference points. A second longitudinal acceleration may be selected. The second longitudinal acceleration may be used to further guide the aerial system. The second plurality of reference points, in some embodiments, are selected at least in part based on a minimization of a spatial difference and/or a heading difference. One or more reference points, in some embodiments, are excluded from the second plurality of reference points at least in part based on a threshold spatial difference and/or a threshold heading difference.

In some embodiments, determining the longitudinal acceleration is performed without a priori information of a desired longitudinal acceleration. Determining the longitudinal acceleration, in some embodiments, is performed without determining a lateral acceleration.

Figure 25:
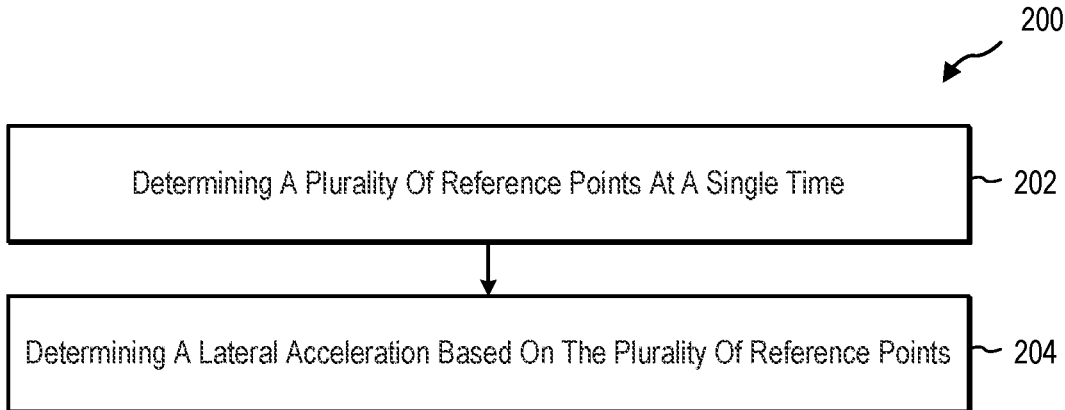
FIG. 25 illustrates a flow diagram for a method or a series of acts for guiding an aerial system as described herein, according to at least one embodiment of the present disclosure.

FIG. 25 illustrates a flow diagram for a method 200 or a series of acts for guiding an aerial system as described herein, according to at least one embodiment of the present disclosure. While FIG. 25 illustrates acts according to one embodiment, alternative embodiments may add to, omit, reorder, or modify any of the acts of FIG. 25.

The method 200 includes an act 202 of determining a plurality of reference points at a single time. The reference points may be determined according to one or more methods described herein. For example, the plurality of reference points may form a set of N number of reference points, $P_N$, each at their own respective $L_N$ distance away from the aircraft, may be selected to create an $L_N$ set where $\{L_1 > L_2 > \ldots > L_N\}$.

The method 200 includes an act 206 of determining a lateral acceleration based on the plurality of reference points. For example, a lateral acceleration needed to guide an aerial system to a corresponding reference point may be determined.

In some embodiments, a lateral acceleration may be selected from the lateral accelerations determined for the plurality of reference points. The selected lateral acceleration may be used to guide the aerial system.

In some embodiments, determining the lateral acceleration includes determining a set of reference points. The set of reference points, in some embodiments, are a distance away from the aerial system. For example, the set of reference points may be a distance $L_N$ from the aerial system. In some embodiments, the set of reference points are equidistant from the aerial system. Determining the lateral acceleration, in some embodiments, includes determining an aircraft velocity vector.

In some embodiments, determining the lateral acceleration includes determining a lateral acceleration command using the formula:

$$a_{cmd,N} = \frac{\|V_T\|^2}{R} = 2\frac{\|V_T\|^2}{L_N}\sin\eta_N. \tag{1}$$

where $$\sin\eta_N = \frac{V_T \times L_N}{\|V_T\| \|L_N\|} \tag{2}$$

and $V_T$ is the determined aircraft velocity vector.

Determining the lateral acceleration, in some embodiments, includes weighting a lateral acceleration command. In some embodiments, weighting the lateral acceleration command includes a forward weighting. Weighting the lateral acceleration command, in some embodiments, uses the formula:

$$a_{cmd} = \sum_{n=1}^{N}\omega_n a_{cmd,N}. \tag{3}$$

In some embodiments, further including determining a roll command based on a plurality of points using the formula: (4).

$$\sin\phi_{cmd} = \frac{L_y}{L} = \frac{L_y}{W} = \frac{ma_{cmd}}{mg} = \frac{a_{cmd}}{g}. \tag{4}$$

A pitch command, in some embodiments, is determined based on a plurality of points using the formula:

$$\theta_{cmd,N} = \eta_N - \gamma = \sin^{-1}\left(\frac{h_N}{L_N + h_N}\right) - \sin^{-1}\left(\frac{V_z}{\|V_{x,y}\|}\right). \tag{5}$$

In some embodiments, determining a series of lateral accelerations is based on a series of a plurality of reference points over time. For example, a sampling rate is at least 10 Hz. In another example, the sampling rate is between 10 Hz and 100 Hz.

Figure 26:
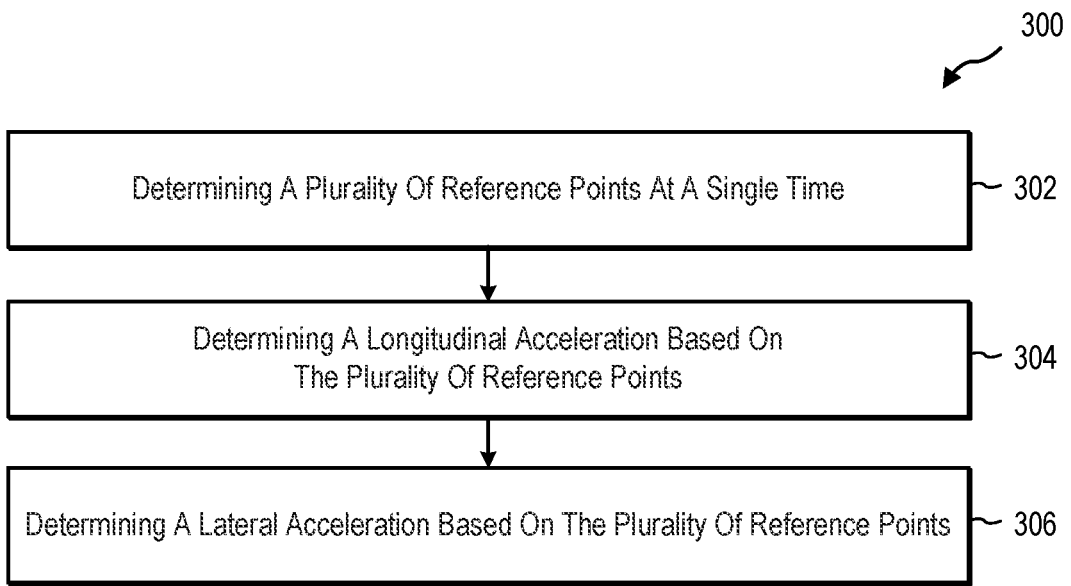
FIG. 26 illustrates a flow diagram for a method or a series of acts for guiding an aerial system as described herein, according to at least one embodiment of the present disclosure.

FIG. 26 illustrates a flow diagram for a method 300 or a series of acts for guiding an aerial system as described herein, according to at least one embodiment of the present disclosure. While FIG. 26 illustrates acts according to one embodiment, alternative embodiments may add to, omit, reorder, or modify any of the acts of FIG. 26.

The method 300 includes an act 302 of determining a plurality of reference points at a single time. The reference points may be determined according to one or more methods described herein.

The method 300 includes an act 304 of determining a longitudinal acceleration based on one or more of the plurality of reference points.

The method 300 includes an act 306 of determining a lateral acceleration based on one or more of the plurality of reference points.

Figure 27:
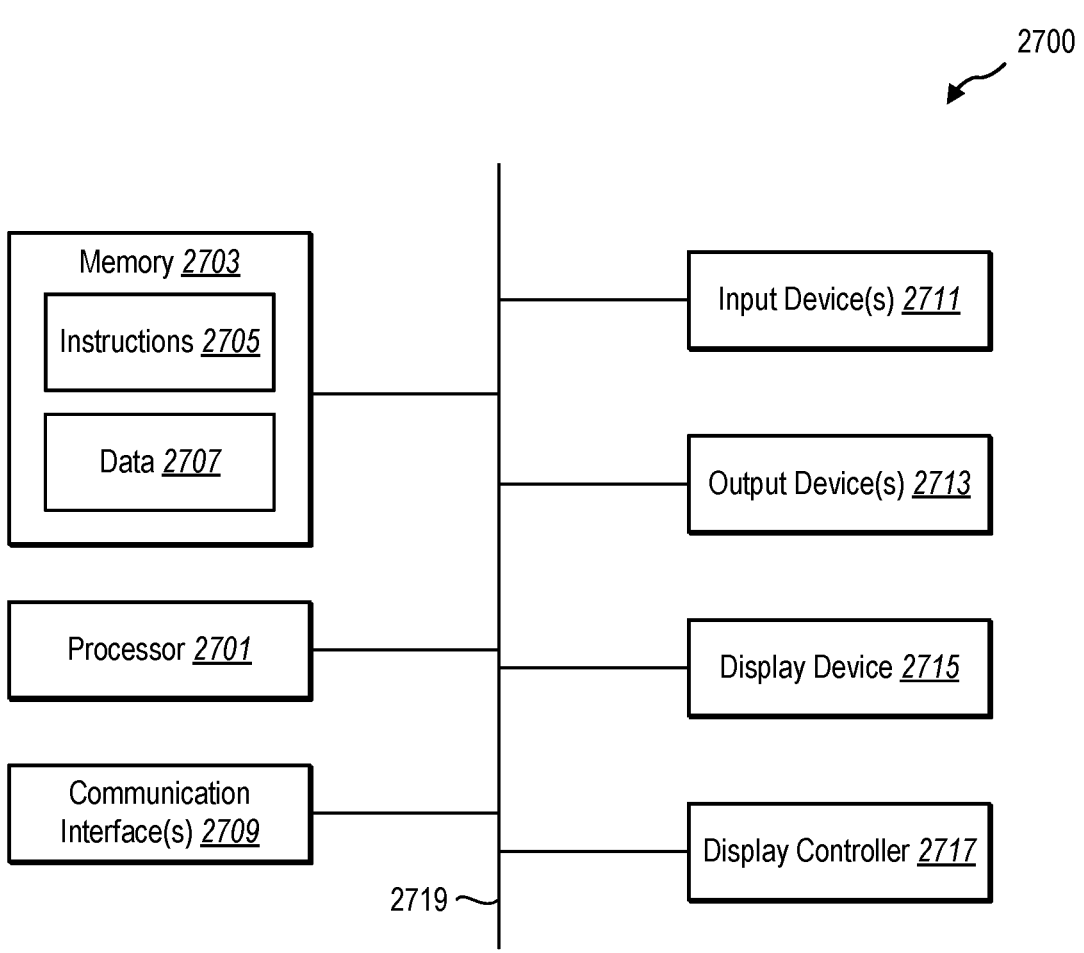
FIG. 27 illustrates this figure illustrates certain components that may be included within an aerial system as described herein, according to at least one embodiment of the present disclosure.

Turning now to FIG. 27, this figure illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 26, in an alternative configuration, a combination of processors (e.g., an ARM and DSP) could be used.

The computer system 800 also includes memory 803 in electronic communication with the processor 801. The memory 803 may include computer-readable storage media and can be any available media that can be accessed by a general purpose or special purpose computer system. Computer-readable media that store computer-executable instructions are non-transitory computer-readable media (device). Computer-readable media that carry computer-executable instructions are transmission media. Thus, by way of example and not limitations, embodiments of the present disclosure can comprise at least two distinctly different kinds of computer-readable media: non-transitory computer-readable media (devices) and transmission media.

Both non-transitory computer-readable media (devices) and transmission media may be used temporarily to store or carry software instructions in the form of computer readable program code that allows performance of embodiments of the present disclosure. Non-transitory computer-readable media may further be used to persistently or permanently store such software instructions. Examples of non-transitory computer-readable storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which can be used to store program code in the form of computer-executable instructions or data structures and which can be accessed by a general purpose or special purpose computer, whether such program code is stored or in software, hardware, firmware, or combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The communication interfaces 809 may connect the computer system 800 to a network. A "network" or "communications network" may generally be defined as one or more data links that enable the transport of electronic data between computer systems and/or modules, engines, or other electronic devices, or combinations thereof. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instruction or data structures and which can be accessed by a general purpose or special purpose computer.

A computer system 800 may also include one or more input devices 811 and one or more output devices 813. Some examples of input devices 811 include a camera, a keyboard, mouse, microphone, remote control device, button, joystick, trackball, and touchpad. Some examples of output devices 813 include a speaker and a light emitter. One specific type of output device that is typically included in a computer system 800 is a display device 815. A display controller 817 may also be provided, for converting data 807 stored in the memory 803 into one or more of text, graphics, or moving images (as appropriate) shown on the display device 815.

The various components of the computer system 800 may be coupled together by one or more buses, which may include one or more of a power bus, a control signal bus, a status signal bus, a data bus, other similar components, or combinations thereof. For the sake of clarity, the various buses are illustrated in FIG. 26 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Further, upon reaching various computer system components, program code in the form of computer-executable instructions or data structures can be transferred automatically or manually from transmission media to non-transitory computer-readable storage media (or vice versa). For example, computer executable instructions or data structures received over a network or data link can be buffered in memory (e.g., RAM) within a network interface module (NIC), and then eventually transferred to computer system RAM and/or to less volatile non-transitory computer-readable storage media at a computer system. Thus, it should be understood that non-transitory computer-readable storage media can be included in computer system components that also (or even primarily) utilize transmission media.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for guiding an aerial system, comprising:
receiving a plurality of reference points positioned along a desired path for the aerial system, the desired path including a first segment and a second segment;
determining, at a single time and for each reference point of the plurality of reference points, a reference longitudinal acceleration for directing the aerial system from a current position of the aerial system to the associated reference point;
determining, based on a weighted average of the reference longitudinal accelerations for the plurality of reference points, a longitudinal acceleration command for directing the aerial system along a continuous path extending from the first segment to the second segment of the desired path; and
adjusting a pitch of the aerial system to implement the longitudinal acceleration command to direct the aerial system along the continuous path.

2. The method of claim 1, wherein the first segment and the second segment are joined at a corner.

3. The method of claim 2, wherein the weighted average includes a back weighting.

4. The method of claim 2, wherein weighting the longitudinal acceleration command includes a using an adaptive weighting set based on a predetermined angle.

5. The method of claim 4, wherein the predetermined angle is a ninety-degree angle.

6. The method of claim 1, further comprising:
determining, at a second single time after the single time and for each reference point of the plurality of reference points, an updated longitudinal acceleration command for directing the aerial system from an updated current point of the aerial system to the associated reference point;
determining, based on a weighted average of the updated reference longitudinal accelerations for the plurality of reference points, an updated longitudinal acceleration command for directing the aerial system along the continuous path; and
adjusting the pitch of the aerial system to implement the updated longitudinal acceleration command to direct the aerial system along the continuous path.

7. The method of claim 6, wherein the weighted average is determined based on prioritizing one or more reference points of the plurality of reference points based on a minimization of a spatial difference and/or a heading difference.

8. The method of claim 7, wherein prioritizing includes excluding at least one reference point from the plurality of reference points based on a threshold spatial difference and/or a threshold heading difference.

9. The method of claim 1, wherein determining the longitudinal acceleration command is performed without a priori information of a desired longitudinal acceleration.

10. The method of claim 1, wherein determining the longitudinal acceleration command is performed independent of determining a lateral acceleration command.

11. A method for guiding an aerial system, comprising:
receiving a plurality of reference points positioned along a desired path for the aerial system, the desired path including a first segment and a second segment;
determining, at a single time and for each reference point of the plurality of reference points, a reference lateral acceleration for directing the aerial system from a current position of the aerial system to the associated reference point;
determining, based on a weighted average of the reference lateral accelerations for the plurality of reference points, a lateral acceleration command for directing the aerial system along a continuous path extending from the first segment to the second segment of the desired path; and
adjusting a yaw of the aerial system to implement the lateral acceleration command to direct the aerial system along the continuous path.

12. The method of claim 11, wherein the first segment and the second segment are joined at a corner.

13. The method of claim 12, wherein the plurality of reference points include at least some reference points along the first segment and at least some reference points along the second segment.

14. The method of claim 12, wherein the lateral acceleration command is normal to the continuous path.

15. The method of claim 11, wherein determining the lateral acceleration command includes determining an aircraft velocity vector.

16. The method of claim 11, wherein the weighted average includes a forward weighting.

17. The method of claim 16, wherein determining the weighted average includes updating the forward weighting based on an angle between the first segment and the second segment.

18. The method of claim 11, further comprising determining a series of lateral accelerations based on a series of a plurality of reference points over time.

19. The method of claim 11, further comprising determining updated reference lateral accelerations at sampling rate of at least 10 Hz.

20. A method for guiding an aerial system, comprising:

receiving a plurality of reference points positioned along a desired path for the aerial system, the desired path including a first segment and a second segment oriented in 3-dimensional space;

determining, at a single time and for each reference point of the plurality of reference points:

a reference lateral acceleration for directing a lateral movement of the aerial system from a current position to the associated reference points; and a reference longitudinal acceleration for directing a longitudinal movement of the aerial system from the current position to the associated reference points;

determining, based on a weighted average of the reference lateral accelerations for the plurality of reference points, a lateral acceleration command for directing the lateral movement of the aerial system along a continuous path extending from the first segment to the second segment;

determining, based on a weighted average of the reference longitudinal accelerations for the plurality of reference points, a longitudinal acceleration command for directing the longitudinal movement of aerial system along the continuous path; and adjusting a pitch and a yaw of the aerial system to implement the lateral acceleration command and the longitudinal acceleration command to direct the aerial system along the continuous path.

\* \* \* \* \*